(12) United States Patent
Zedan et al.

(10) Patent No.: US 10,898,880 B2
(45) Date of Patent: Jan. 26, 2021

(54) METHOD OF MAKING A COPPER OXIDE-TITANIUM DIOXIDE NANOCATALYST

(71) Applicant: QATAR UNIVERSITY, Doha (QA)

(72) Inventors: Abdallah F. Zedan, Doha (QA); Siham Y. Alqaradawi, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/083,477

(22) PCT Filed: Mar. 9, 2017

(86) PCT No.: PCT/US2017/021669
§ 371 (c)(1),
(2) Date: Sep. 7, 2018

(87) PCT Pub. No.: WO2017/156330
PCT Pub. Date: Sep. 14, 2017

(65) Prior Publication Data
US 2019/0060877 A1   Feb. 28, 2019

Related U.S. Application Data

(60) Provisional application No. 62/306,041, filed on Mar. 9, 2016.

(51) Int. Cl.
*B01J 23/72* (2006.01)
*B01J 37/03* (2006.01)
(Continued)

(52) U.S. Cl.
CPC ............ *B01J 23/72* (2013.01); *B01D 53/864* (2013.01); *B01J 21/063* (2013.01); *B01J 35/002* (2013.01);
(Continued)

(58) Field of Classification Search
CPC ...... B01J 23/72; B01J 21/063; B01J 35/0013; B01J 35/002; B01J 35/023; B01J 37/009;
(Continued)

(56) References Cited

U.S. PATENT DOCUMENTS

2010/0179053 A1   7/2010   Lin
2012/0152336 A1*  6/2012   Cao ................. B82Y 30/00
                                                136/254
(Continued)

FOREIGN PATENT DOCUMENTS

CN   101773827 A   7/2010
CN   101956223 A   1/2011
(Continued)

OTHER PUBLICATIONS

Nancy O. Savage et al., "Titanium dioxide based high temperature carbon monoxide selective sensor", Sensors and Actuators B (2001), vol. 72, pp. 239-248.
(Continued)

*Primary Examiner* — James A Fiorito
(74) *Attorney, Agent, or Firm* — Nath, Goldberg & Meyer; Richard C. Litman

(57) ABSTRACT

A method of making a copper oxide-titanium dioxide nanocatalyst for performing the catalytic oxidation of carbon monoxide is provided. The copper oxide-titanium dioxide nanocatalyst is in the form of copper oxide (CuO) nanoparticles supported on mesoporous titanium dioxide ($TiO_2$) nanotubes. The copper oxide-titanium dioxide nanocatalyst is prepared by adding an aqueous solution of $Cu(NO_3)_2 \cdot 3H_2O$ to an aqueous suspension of titanium dioxide nanotubes. Deposition precipitation at constant alkaline pH is used to form the copper oxide nanoparticles supported on mesoporous titanium dioxide nanotubes. Aqueous sodium carbonate is used to adjust the pH. The solid matter (copper
(Continued)

oxide deposited on titanium dioxide nanotubes) is separated from the suspension, washed, dried and calcined, yielding the copper oxide-titanium dioxide nanocatalyst. Carbon monoxide may then flow over a fixed-bed reactor loaded with the copper oxide-titanium dioxide nanocatalyst at a temperature between 80° C. and 200° C.

9 Claims, 26 Drawing Sheets

(51) Int. Cl.
    *B01J 37/34* (2006.01)
    *B01J 21/06* (2006.01)
    *B01J 35/00* (2006.01)
    *B01J 35/02* (2006.01)
    *B01D 53/86* (2006.01)
    *B01J 37/00* (2006.01)
    *B01J 37/04* (2006.01)
    *B01J 37/06* (2006.01)
    *B01J 37/08* (2006.01)
    *B01J 35/10* (2006.01)

(52) U.S. Cl.
    CPC ......... *B01J 35/0013* (2013.01); *B01J 35/023* (2013.01); *B01J 37/009* (2013.01); *B01J 37/035* (2013.01); *B01J 37/04* (2013.01); *B01J 37/06* (2013.01); *B01J 37/08* (2013.01); *B01J 37/343* (2013.01); *B01D 2255/20707* (2013.01); *B01D 2255/20761* (2013.01); *B01D 2255/9202* (2013.01); *B01J 35/10* (2013.01); *B01J 35/1014* (2013.01); *B01J 35/1019* (2013.01); *B01J 2523/17* (2013.01); *B01J 2523/47* (2013.01)

(58) Field of Classification Search
    CPC . B01J 37/035; B01J 37/04; B01J 37/06; B01J 37/08; B01J 37/343; B01D 53/864
    See application file for complete search history.

(56) References Cited

U.S. PATENT DOCUMENTS

2013/0017611 A1    1/2013    Li
2016/0045908 A1    2/2016    Kumari et al.
2017/0267542 A1*    9/2017    Yang .................... C01G 23/053

FOREIGN PATENT DOCUMENTS

| CN | 102240550 A | 11/2011 |
| CN | 102249183 A | 11/2011 |
| CN | 104525220 A | 4/2015 |
| CN | 104959150 A | 10/2015 |

OTHER PUBLICATIONS

Jing Huang et al., "Synthesis and characterzation of CuO/TiO2 catalysts for low-temperature CO oxidation", Catalysis Communications (2006) vol. 7, pp. 1029-1034.
Naofumi Nomura et al., "Effect of Acid-Base Properties on Copper Catalysts for Hydrogenation of Carbon Dioxide", React. Kinet. Catal. Lett. (1998), vol. 63, No. 1, pp. 21-25.
Chen et al., "Effect of Ti3+ on TiO2-Supported Cu Catalysts Used for CO Oxidation", Langmuir (2012), vol. 28, pp. 9996-10006.
Kumar et al., "Solar Light Acive CuO/TiO2 Nanobelt Photocatalyst for Enhanced H2 Production", Proceedings of the International Conference on Advanced Nanomaterials and Emerging Engineering Technologies (2013), pp. 440-442.
Qi-Wei Han et al., Synthesis and Catalytic Performance of CuO Modified-TiO2 Nanotubes with High Thermal Stability via Functionalized Sol Modification, Chinese Journal of Inorganic Chemistry (2014), vol. 30, No. 3, pp. 573-578.
Extended European Search Report, Application No. 17764142.0, dated Oct. 4, 2019.
Cao Jian Liang et al., "Hierarchical meso-macroporous titania-supported CuO nanocatalysts:preparation, characterization and catalytic CO oxidation," J. of Materials Sci. 44(24): pp. 6717-6726 (2009).
Zhu B et al., "Characterization and catalytic performance of TiO"2 nanotubes-supported gold and copper particles," J. of Mol. Catalysis A: Chemical, 249(1-2): pp. 211-217 (2006).

* cited by examiner

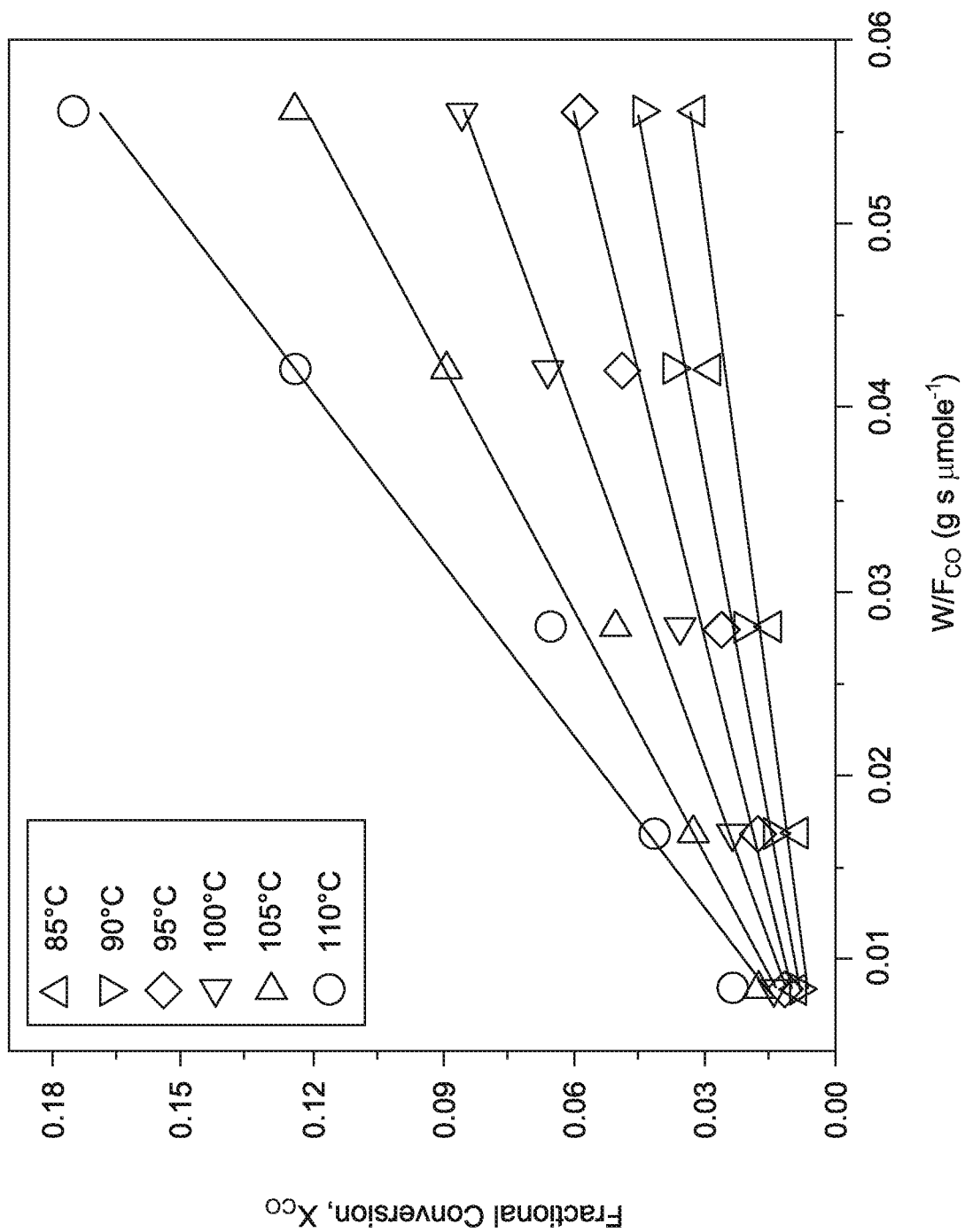

METHOD OF MAKING A COPPER OXIDE-TITANIUM DIOXIDE NANOCATALYST

TECHNICAL FIELD

The present invention relates to heterogeneous catalytic carbon monoxide (CO) oxidation, and particularly to a method of making a copper oxide-titanium dioxide nanocatalyst for performing catalytic oxidation of carbon monoxide.

BACKGROUND ART

Heterogeneous catalytic carbon monoxide (CO) oxidation is an important reaction for the removal of small amounts of potentially poisonous CO from numerous situations, such as in fuel cell applications and environmental remediation processes. Plasmonic nanocatalysts supported on reducible metal oxides, such as $CeO_2$ and $TiO_2$, have been used due to their superior catalytic activity at very low temperatures, but they are relatively expensive and are susceptible to particle agglomeration and sintering at high operating temperatures. Transition metals supported on reducible metal oxides are of considerable interest due to their relatively low costs and versatility, along with activities per unit surface area similar to those of noble metal catalysts. Such catalysts have also been shown to have high oxygen release capacity at a high range of temperatures, and have further been shown to be good candidate materials for oxygen storage, as well as providing oxygen for combustion and oxidation reactions at high temperatures. In particular, supported copper oxide (CuO) nanostructures have received a great deal of attention as inexpensive and non-plasmonic catalysts for oxidation reaction.

Titanium dioxide ($TiO_2$) nanotubes with different microstructures and surface morphologies have been synthesized by various techniques, such as electrochemical anodic oxidation, template-assisted electrodeposition, and the hydrothermal method. In the anodic fabrication of $TiO_2$ nanotubes, highly ordered structures on a substrate can be easily obtained, but the potential for mass production is limited. For the templating method, the fabrication procedure includes many steps and great care must be taken during template removal in order to keep the nanotubes intact. Among them, the hydrothermal treatment method has received great attention owing to a fairly simple synthesis, relatively low cost processing, and chemical versatility and scalability, even though randomly aligned nanotubes are mainly obtained. It would obviously be desirable to be able to easily synthesize a catalyst making use of the desirable properties of copper oxide nanostructures and titanium dioxide nanotube support. Thus, a method of making a copper oxide-titanium dioxide nanocatalyst solving the aforementioned problems is desired.

DISCLOSURE OF INVENTION

The method of making a copper oxide-titanium dioxide nanocatalyst is a process for preparing a catalyst for performing catalytic oxidation of carbon monoxide. The copper oxide-titanium dioxide nanocatalyst is in the form of copper oxide (CuO) nanoparticles supported on mesoporous titanium dioxide ($TiO_2$) nanotubes. The copper oxide-titanium dioxide nanocatalyst is prepared by adding an aqueous solution of $Cu(NO_3)_2 \cdot 3H_2O$ to an aqueous suspension of titanium dioxide nanotubes. Deposition precipitation at constant alkaline pH is used to form the copper oxide nanoparticles supported on mesoporous titanium dioxide nanotubes. Aqueous sodium carbonate is used to adjust the pH. The solid matter (i.e., copper oxide deposited on titanium dioxide nanotubes) is separated from the suspension, washed, dried and calcined, yielding the copper oxide-titanium dioxide nanocatalyst. Carbon monoxide may then flow over a fixed-bed reactor loaded with the copper oxide-titanium dioxide nanocatalyst at a temperature between 80° C. and 200° C. to catalyze oxidation of the carbon monoxide.

These and other features of the present invention will become readily apparent upon further review of the following specification and drawings.

BRIEF DESCRIPTION OF THE DRAWINGS

FIG. 19B shows the variation of the CO fractional conversion as a function of the mass (W) to molar flow ($F_{CO}$) ratio for copper oxide-titanium dioxide nanocatalysts with 20 wt % CuO.

Similar reference characters denote corresponding features consistently throughout the attached drawings.

BEST MODES FOR CARRYING OUT THE INVENTION

Figure 1:
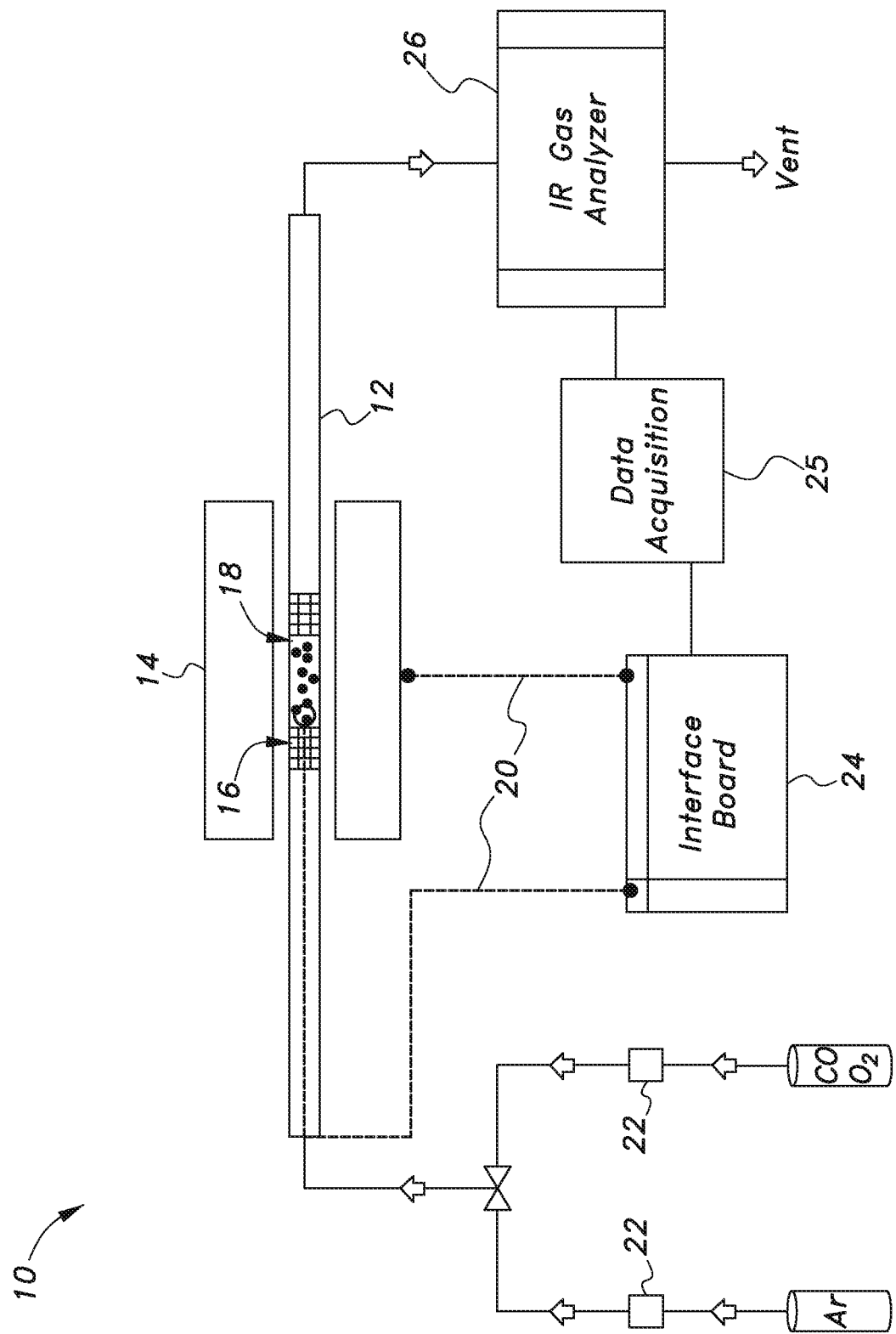
FIG. 1 is a schematic diagram of a continuous flow fixed-bed catalytic reactor used for catalytic carbon monoxide (CO) oxidation experiments to determine the activity of a copper oxide-titanium dioxide nanocatalyst prepared by the method of making a copper oxide-titanium dioxide nanocatalyst according to the present invention.

The method of making a copper oxide-titanium dioxide nanocatalyst is a process for preparing a catalyst for performing catalytic oxidation of carbon monoxide. The copper oxide-titanium dioxide nanocatalyst is in the form of copper oxide (CuO) nanoparticles supported on mesoporous titanium dioxide ($TiO_2$) nanotubes. The copper oxide-titanium dioxide nanocatalyst is prepared by adding an aqueous solution of $Cu(NO_3)_2 \cdot 3H_2O$ to an aqueous suspension of titanium dioxide nanotubes. Deposition precipitation at constant alkaline pH is used to form the copper oxide nanoparticles supported on mesoporous titanium dioxide nanotubes. Aqueous sodium carbonate is used to adjust the pH. The solid matter (i.e., copper oxide deposited on titanium dioxide nanotubes) is separated from the suspension, washed, dried and calcined, yielding the copper oxide-titanium dioxide nanocatalyst. Carbon monoxide may then flow over a fixed-bed reactor loaded with the copper oxide-titanium dioxide nanocatalyst at a temperature between 80° C. and 200° C. to catalyze oxidation of the carbon monoxide.

The initial $TiO_2$ nanotube support was prepared by the hydrothermal treatment of anatase $TiO_2$ powder in concentrated aqueous NaOH solution, followed by acid treatment in HCl solution. In an exemplary synthesis, 2 g of $TiO_2$ anatase powder was added to 40 mL of 10 M NaOH aqueous solution in a 100 ml Teflon® vessel, specifically a Teflon®-lined stainless steel autoclave. This mixture was stirred for 30 minutes, and then the Teflon® vessel was placed in an electric oven and heated at 140° C. for 48 hours. After this hydrothermal treatment, the products were separated by filtration and rinsed three times with deionized water. The products were then soaked in an aqueous solution for two hours at room temperature after adjusting the pH to 6 with 0.1 M HCl. The products were separated by filtration and dried in an oven at 80° C. overnight. Different samples, both with and without the acid treatment, were calcined at 450° C. for two hours at a ramp rate of 2° C./minute.

The copper oxide-titanium dioxide ($CuO/TiO_2$) nanotube catalyst was synthesized by the deposition precipitation (DP) method at room temperature and constant pH. As noted above, the $CuO/TiO_2$ nanocatalyst was prepared by mixing an aqueous suspension of the $TiO_2$ nanotubes, prepared as described above, and Cu(NO$_3$)$_2$.3H$_2$O with a solution of precipitating agent (Na$_2$CO$_3$) at constant pH and room temperature. Precipitates with different loadings of CuO (2-65 wt %) in mixture with TiO$_2$ were prepared by changing the molar ratio of Cu$^{2+}$ to TiO$_2$ nanotube support.

In an exemplary synthesis, 100 mg of TiO$_2$ nanotube powder, prepared as described above, was suspended in 100 mL of deionized (DI) water, and the suspension was sonicated for 10 minutes. A pre-determined volume of an aqueous solution containing an appropriate amount of Cu (NO$_3$)$_2$.3H$_2$O was added to the TiO$_2$ suspension, and the mixture was stirred at room temperature for two hours. An appropriate volume of 0.2 mol/L Na$_2$CO$_3$ aqueous solution was then added dropwise to this suspension until the pH of the suspension reached about 9. The mixture with the precipitate was then aged under stirring for another five hours. Upon completion, the resulting precipitate was separated by centrifuge, washed three times with DI water, and then dried at 80° C. in air for 24 hours. The dried powder was calcined in a muffle furnace at 400° C. for two hours in air with a ramp rate of 2° C./minute.

For the analytical results presented below, the experimentally prepared CuO/TiO$_2$ nanocatalysts were characterized with various physical and chemical techniques. Transmission electron microscopy (TEM) images were acquired using a transmission electron microscope with an accelerated voltage of 200 kV. Powder samples for TEM were dispersed in ethanol by ultrasonication, and a droplet of the colloid suspension was dipped onto a carbon-coated 200-mesh copper grid and allowed to dry in air at room temperature. Scanning electron microscopy (SEM) images and energy dispersive X-ray spectroscopy (EDX) measurements were carried out using an electron scanning microscope. The powder was sputter-coated with gold prior to the SEM analysis whenever needed. Powder X-ray diffraction (XRD) measurements were carried out at room temperature using a diffractometer with Cu KαR radiation at 30 kV and 20 mA, between 2θ angles of 5° and 80° with a scanning rate of 0.025° per step per second. Elemental analyses were carried out using inductively coupled plasma optical emission spectroscopy (ICP-OES) calibrated with standards. Samples were digested in 5 mL concentrated HNO$_3$ overnight, and the solution was diluted with water prior to measurement. Further, nitrogen adsorption and desorption isotherms of different samples were obtained at 77 K using a pore size analyzer in the range of 0.05 to 1 relative pressure $$\left(\frac{P}{P_0}\right).$$

The specific surface area was derived using the Brunauer-Emmett-Teller (BET) method, and the pore size distribution and average pore size were estimated from the adsorption branch using the Barret-Joyner-Halenda (BJH) method. Prior to analysis measurement, all samples were degassed in an N$_2$—He mixture at 90° C. for one hour and at 150° C. for an additional hour.

Additionally, thermal analysis was conducted using a thermal gravimetric analyzer (TGA) from 50° C. to 600° C. in air at a linear heating rate of 10° C./minute. X-ray photoelectron spectroscopy (XPS) measurements were carried out with a monochromatic Al Kα radiation source (1486.6 eV) in a UHV environment (about 5×10$^{-9}$ Torr). The operating conditions were kept constant at a resolution pass energy of 20 eV, emission current of 10 mA, and anode HT of 15 kV. In order to subtract the surface charging effect, the C1s peak at 284.8 eV was used for calibration. Surface composition, when applicable, was determined by normalized integration of the resulting peaks.

Catalytic CO oxidation experiments were performed to determine the activity of the present copper oxide-titanium dioxide nanocatalyst. Experiments were performed using a continuous flow fixed-bed catalytic reactor, such as that shown in FIG. 1. Exemplary continuous flow fixed-bed catalytic reactor 10 included a quartz tube 12 with an inner diameter of 9 mm placed in the middle of a programmable split tube furnace 14, which was used as the reactor tube. In a typical experiment, 50 mg of the test catalyst powder 18 was charged into a bed of quartz wool 16 in the middle area of the quartz tube 12. The catalyst temperature was measured by a thermocouple 20 placed in contact with the catalyst bed.

The reaction gas feed mixture consisted of 4% CO and 20% O$_2$ in a balance of He and was passed through the catalyst bed at a flow rate of 50 cm$^3$/min. The flow rate was controlled by a set of digital mass flow controllers 22. All experiments were carried out at atmospheric pressure (1 atm) in the temperature range of 30° C. to 400° C. with a ramp rate of 4° C./min. The signal from the thermocouple 20 was acquired using an interface board 24 and a data acquisition unit 25. The effluent gas was fed into an inline multichannel infrared gas analyzer 26 to analyze the exit gas and simultaneously monitor the CO conversion. The volume percent of CO, CO$_2$ and O$_2$ gases were determined simultaneously and logged with the catalyst temperature during the course of the experiment. The catalytic activity was expressed by the conversion of CO in the effluent gas and indicated as CO conversion percentage as CO Conversion (%)=[(CO$_{in}$−CO$_{out}$)/CO$_{in}$]×100.

For kinetic measurements, CO oxidation experiments were performed by varying the catalyst loadings as 15, 30, 50, 75 and 100 mg, respectively, while keeping the catalysts bed length and the gas hourly space velocity of the feed gas mixture fixed at 3600 cm$^3$/h. The CO oxidation reaction rates were calculated as $$r_{CO} = X_{CO}\left(\frac{W}{F_{CO}}\right),$$

where $X_{CO}$ is the fractional CO conversion, W is the mass of the catalyst in grams, and $F_{CO}$ is the CO molar flow rate. The apparent activation energies of selected catalysts were determined from the Arrhenius plots using data from the linear region of <20% CO conversion.

Figure 2:
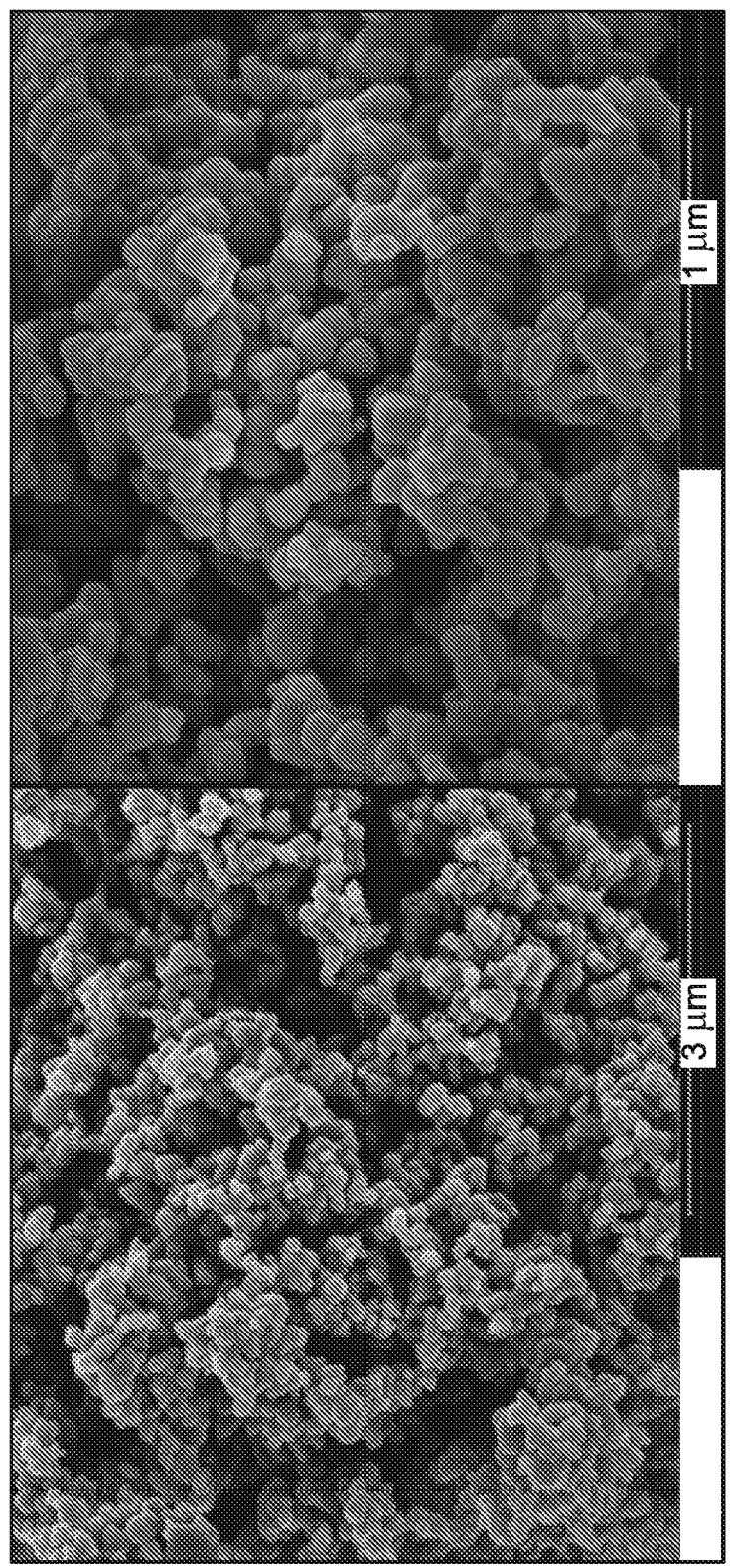
FIG. 2 is a side-by-side comparison of scanning electron microscope (SEM) micrographs at 50,000× magnification and 100,000× magnification, respectively, of spherical titanium dioxide ($TiO_2$) particles used as a starting material for the synthesis of $TiO_2$ nanotubes used in the method of making a copper oxide-titanium dioxide nanocatalyst according to the present invention.
Figure 3:
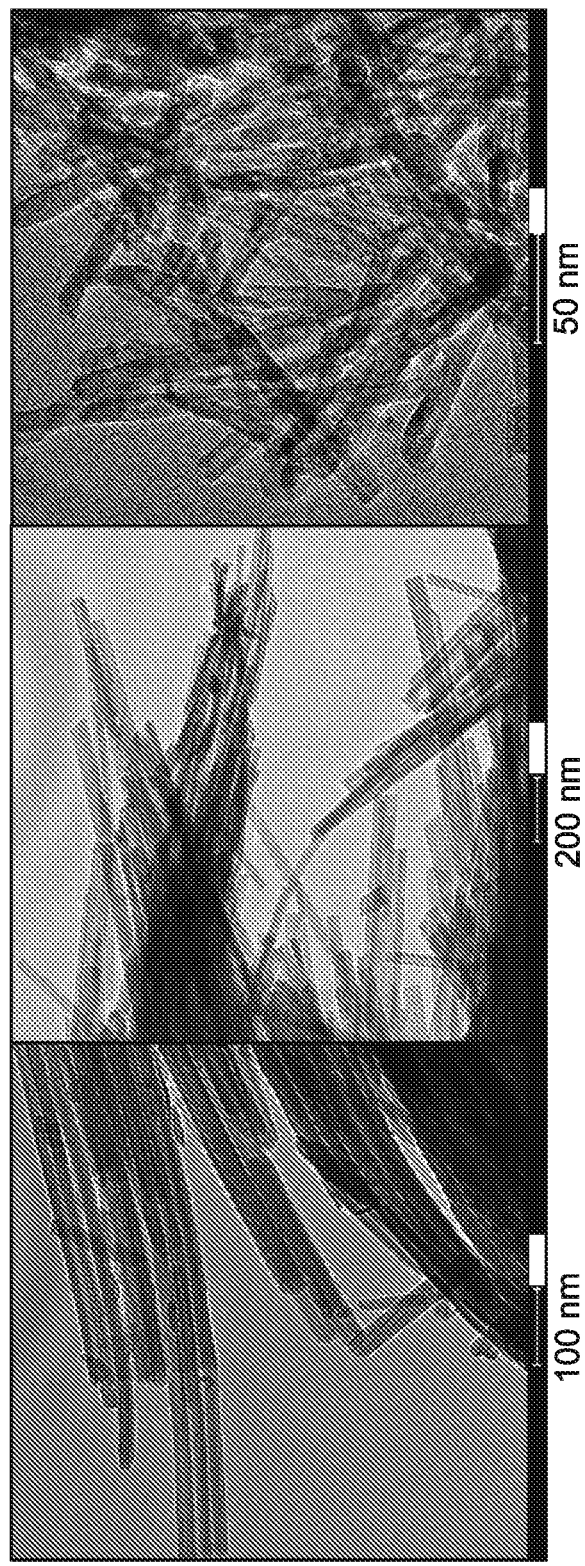
FIG. 3 is a side-by-side comparison of transmission electron microscope (TEM) micrographs of $TiO_2$ nanotubes used in the method of making a copper oxide-titanium dioxide nanocatalyst according to the present invention.

The TiO$_2$ nanotubes prepared by the hydrothermal treatment of spherical TiO$_2$ particles described above are shown in FIG. 3. FIG. 2 is an SEM image of the initial spherical TiO$_2$ particles, and FIG. 3 is a TEM image of the TiO$_2$ nanotube support prepared as described above, by the hydrothermal treatment of anatase TiO$_2$ powder at 140° C. for 48 hours and subsequent treatment in diluted HCl solution. The TiO$_2$ nanotubes exhibit nanotubular structures with an average length of 500 nm, an outer diameter of 10 nm, and an inner diameter of 5 nm. The HR-TEM images shown in FIG. 3 indicate that the nanotubes are open-ended with multi-wall layers on both sides.

Figure 4:
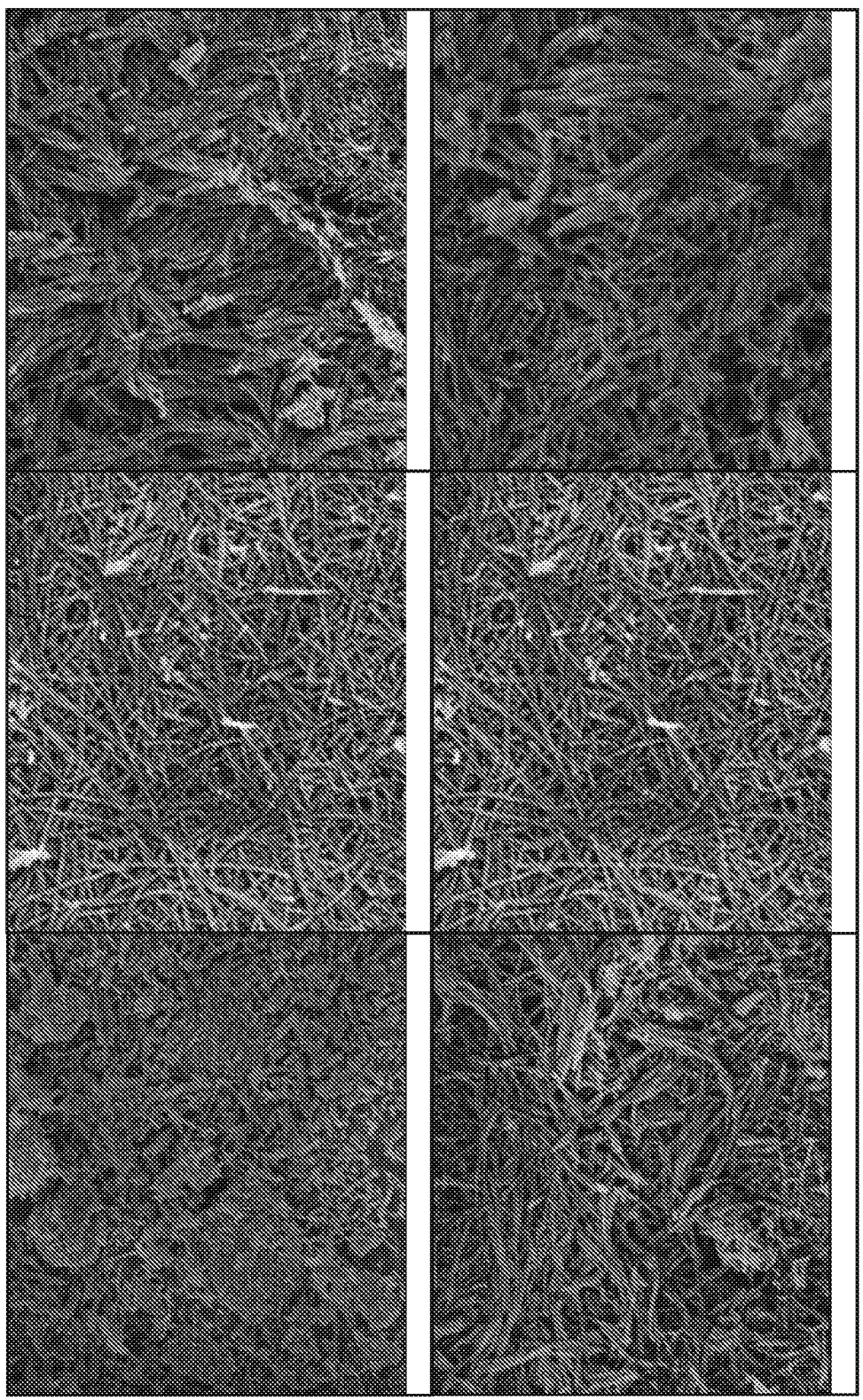
FIG. 4 is a side-by-side comparison of scanning electron microscope (SEM) micrographs of $TiO_2$ nanotube supports used in the method of making a copper oxide-titanium dioxide nanocatalyst according to the present invention at magnifications between 10,000× and 200,000×.

It has been reported that the structure of the nanotubes is affected by the final pH value of the rinse water. After HCl washing at higher pH values, aggregates with low porosities for nanotubes composed of titanate compounds are often obtained. With HCl washing at low pH values of 1-2, high porosity nanotubes aggregates could be obtained. It has been generally accepted that the layered titanate structure identified as $A_2TiO_7$ and $A_2Ti_2O_4(OH)_2/A_2Ti_2O_5 \cdot 3H_2O$ (A=Na and/or H) are transformed into anatase phase $TiO_2$ nanotubes through the Na/H exchange following the acid treatment. As shown in FIGS. 3 and 4, the TEM images (in FIG. 3) and the SEM images (in FIG. 4) indicate that the nanotubular structure was still retained after the acid treatment. Further, the size and morphology of the nanotubes after HCl treatment are similar to those before the acid treatment.

Figure 5:
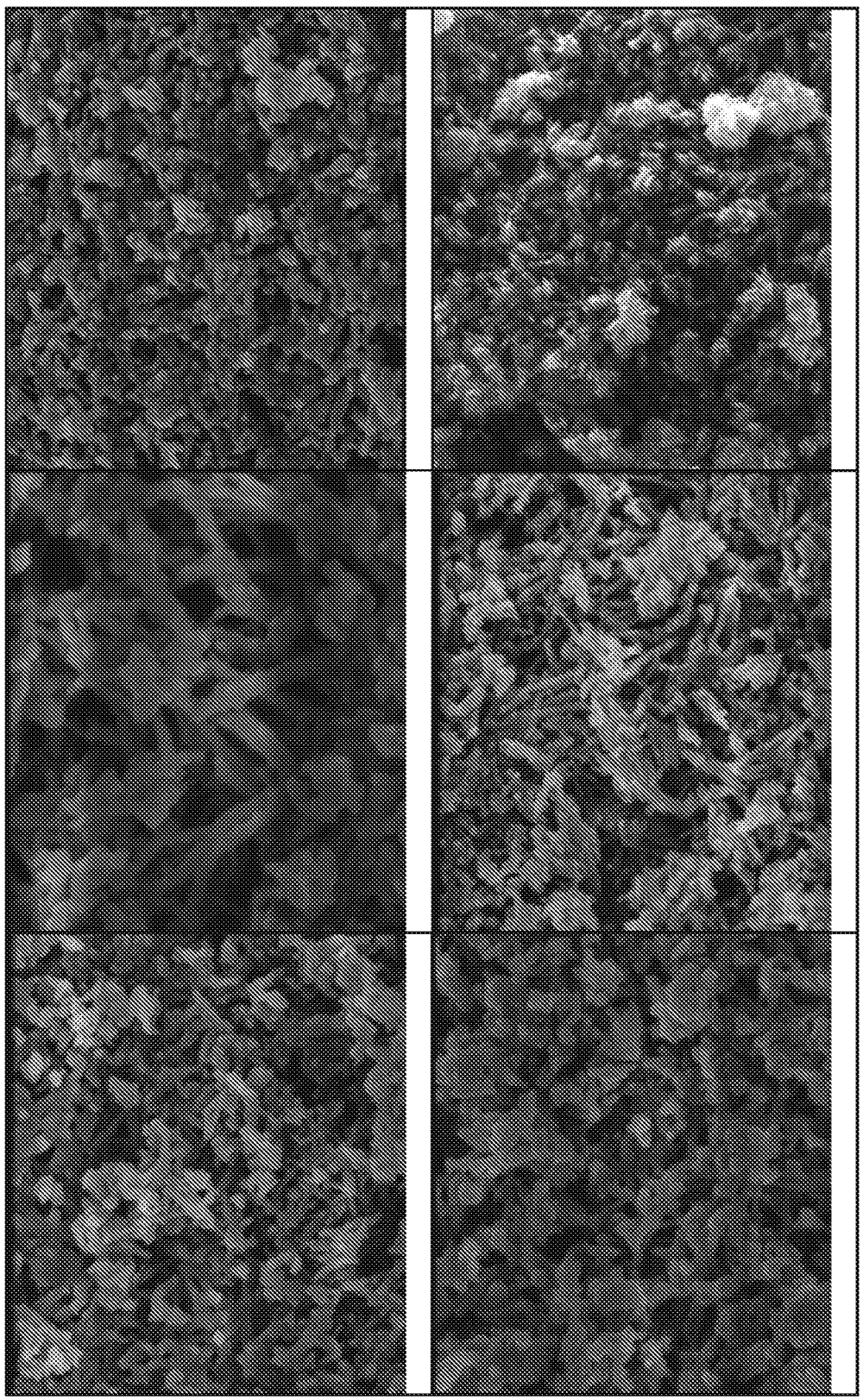
FIG. 5 is a side-by-side comparison of scanning electron microscope (SEM) micrographs of copper oxide-titanium dioxide nanocatalysts made by the method of making a copper oxide-titanium dioxide nanocatalyst according to the present invention at magnifications between 50,000× and 300,000×.

Transition metal oxide couples, such as supported CuO—$Cu_2O$—Cu, have been shown to possess high oxygen release capacity at a high range of temperatures. They have been shown as good candidate materials for oxygen storage, and to provide oxygen for combustion during the reversible phase changes between CuO—$Cu_2O$—Cu at high temperature. The reducible metal oxides can release gaseous oxygen at high temperatures, which can be used for the combustion/oxidation of CO, and the metal oxide can subsequently be regenerated in air. The chemical looping in CuO—$Cu_2O$—Cu requires the reversible phase between CuO—$Cu_2O$—Cu, either from reduction of CuO to Cu by the gaseous fuel (CO in this case), or with the release of gaseous oxygen $O_2$ from $2CuO\,(s) \rightarrow Cu_2O\,(s) + \frac{1}{2}\,O_2\,(g)$, followed by the regeneration in air back to CuO. It should be noted that the equilibrium partial pressure of gaseous $O_2$ release for $Cu_2O$—Cu is too low for practical use. In experiments, highly dispersed CuO nanoparticles supported on $TiO_2$ nanotubes were prepared by DP. FIG. 5 shows typical SEM images of the CuO nanoparticles deposited on $TiO_2$ nanotubes previously treated with 0.1 M HCl aqueous solution (pH 6).

Figure 6:
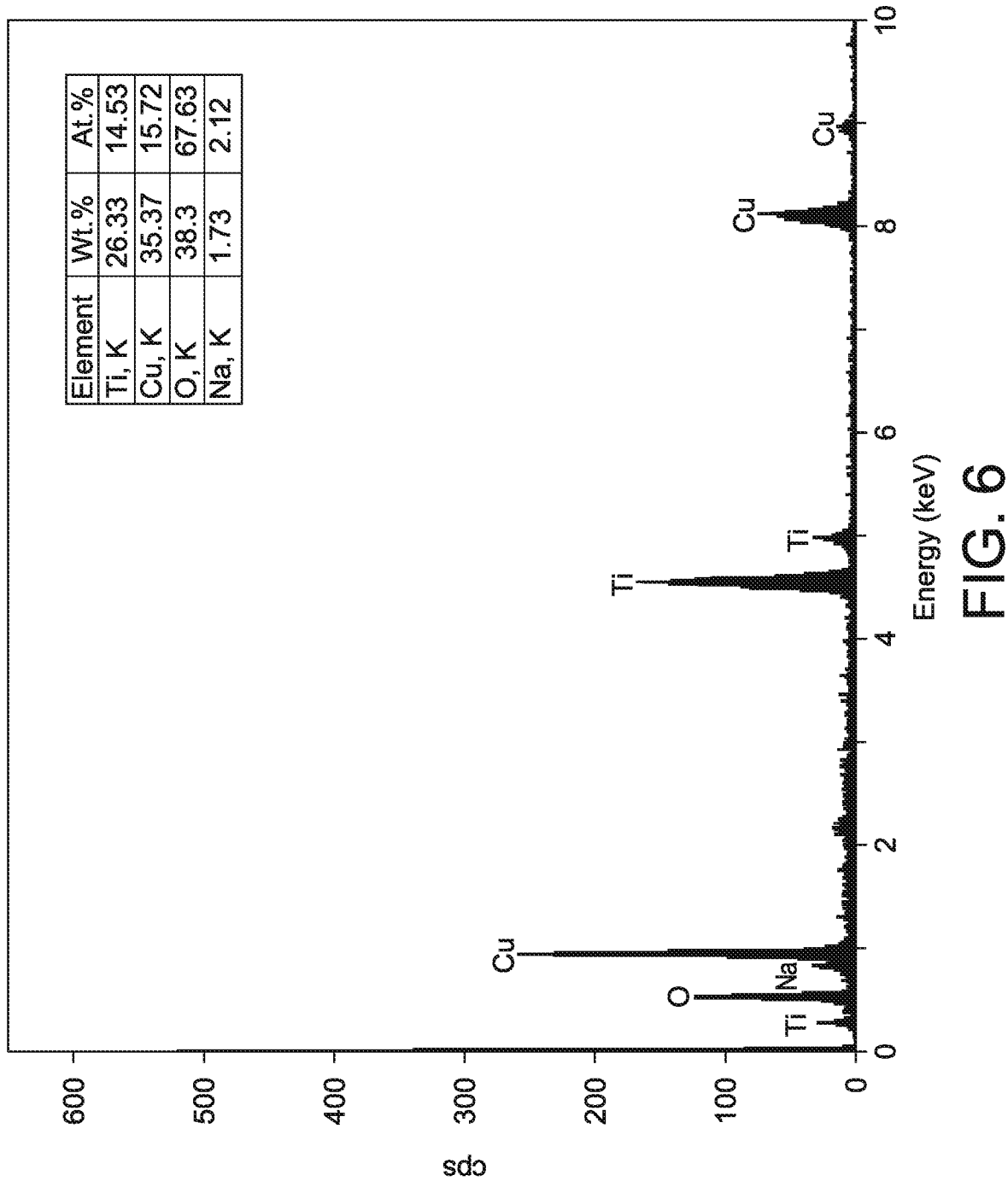
FIG. 6 is the energy dispersive X-ray spectroscopy (EDX) spectrum of a copper oxide-titanium dioxide nanocatalyst made by the method of making a copper oxide-titanium dioxide nanocatalyst according to the present invention.

FIG. 6 is a shows the energy dispersive X-ray spectroscopy (EDX) spectrum of the copper oxide-titanium dioxide nanocatalysts made by the method of making a copper oxide-titanium dioxide nanocatalyst. The EDX analysis reveals that the Na/Ti atomic ratio was about 2%. The low Na/Ti ratio of $TiO_2$ nanotubes used to support the CuO is due to rinsing with 0.1 M HCl and indicates that that Na could be removed after the acid rinse. The decrease in the Na/Ti ratio may be caused by the replacement of $Na^+$ with $H^+$ during the acid rinse. It should be noted that according to some reports, the residue of Na in the $TiO_2$ nanotubes decreases the photocatalytic ability and the Na/H exchange can enhance the photocatalytic properties of titanate-derived $TiO_2$ nanotubes.

Figure 7:
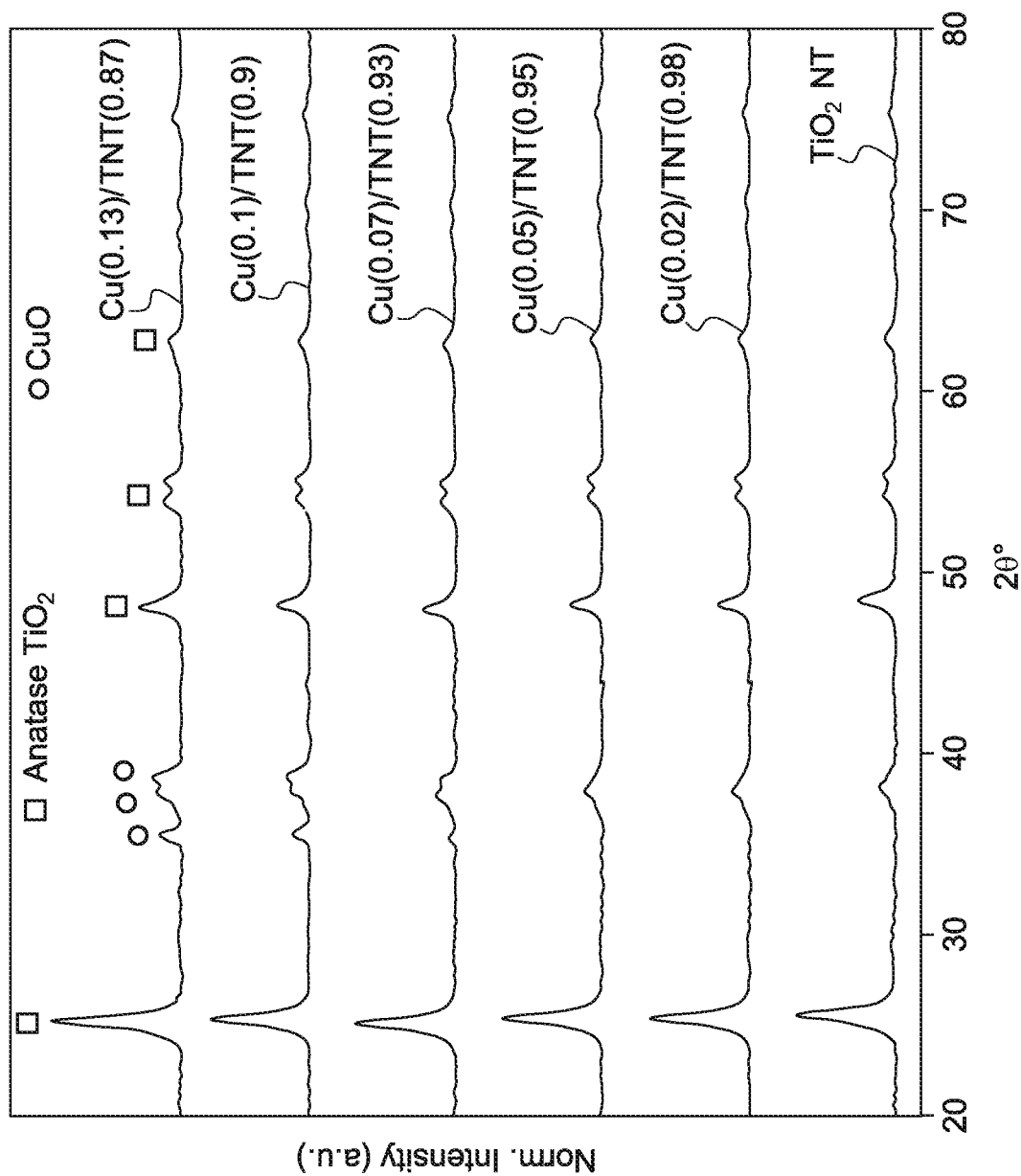
FIG. 7 is a waveform comparison of X-ray diffraction (XRD) patterns for pure $TiO_2$ nanotubes (TNT) against the copper oxide-titanium dioxide nanocatalysts with CuO to $TiO_2$ ratios ranging between 2% and 13%.
Figure 8:
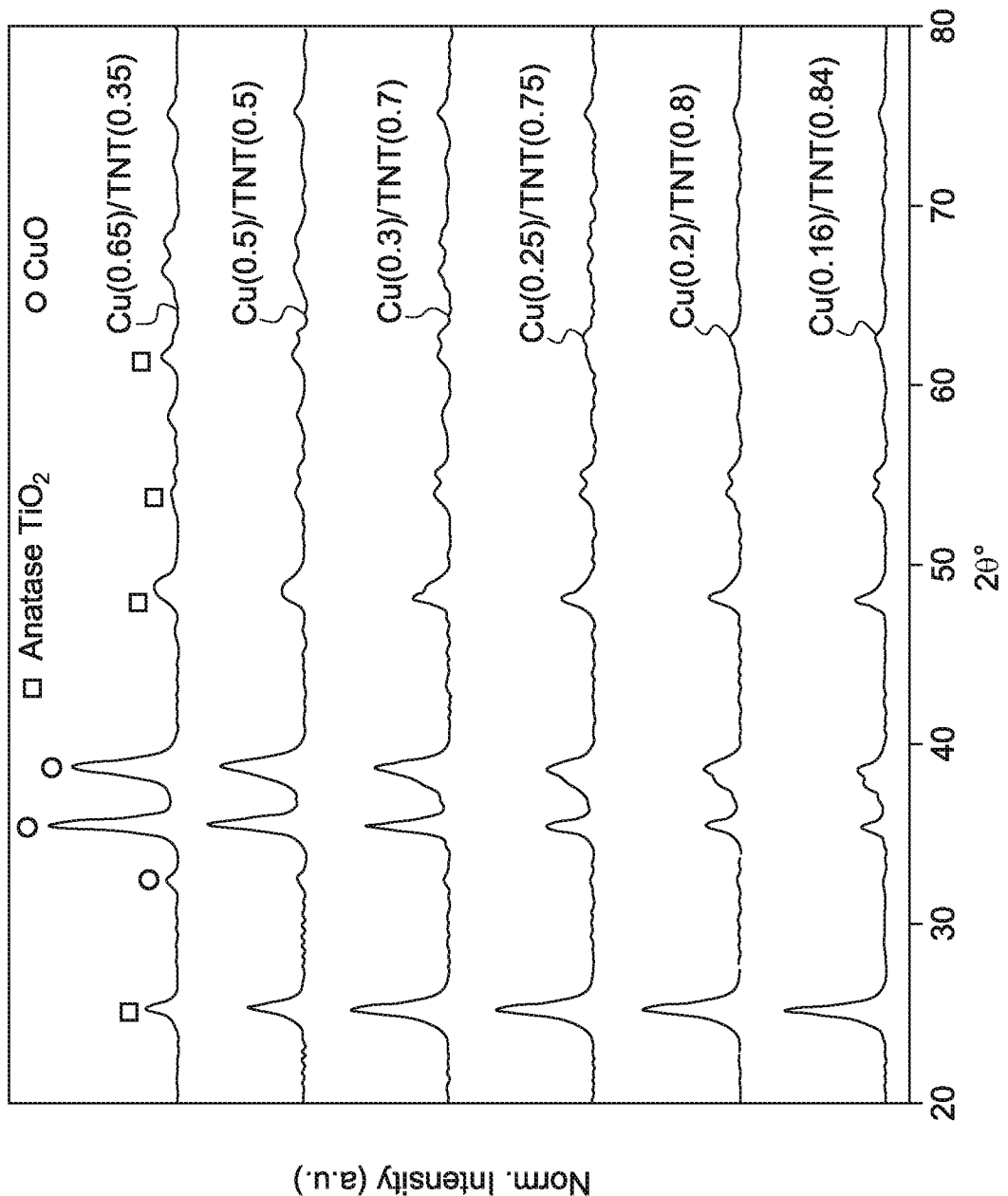
FIG. 8 is a waveform comparison of X-ray diffraction (XRD) patterns for copper oxide-titanium dioxide nanocatalysts with CuO to $TiO_2$ ratios ranging between 16% and 65%.

FIGS. 7 and 8 compare the XRD patterns of pure unmodified $TiO_2$ nanotubes and a series of CuO-modified $TiO_2$ nanotubes with different CuO to $TiO_2$ ratios/compositions. According to the literature, nanotubes obtained by hydrothermal treatment with subsequent HCl rinse show the well-known anatase phase in their XRD patterns. All of the diffraction patterns shown in FIGS. 7 and 8 exhibit reflection peaks at 25.3° (101), 38.1° (112), 48.4° (200), 54.1° (105), 55.3° (211) and 62.8° (204), which are typical of XRD peaks of pure anatase phase as correlated with the reference pattern (Card JCPDS No. 01-071-1166) and are in agreement with anatase $TiO_2$ patterns reported in the literature.

For CuO-modified $TiO_2$ nanotubes, XRD patterns of samples with a CuO content up to 5% do not show reflection peaks of copper oxide phase, and only the phase of anatase $TiO_2$ is observed. This is attributed to the low XRD signal, and a similar behavior was reported for CuO-incorporated $TiO_2$ samples with less than 3% Cu species content. On the other hand, the XRD patterns of CuO-modified $TiO_2$ nanotubes with CuO ratios larger than 5% exhibit reflection peaks at 35.5° (−111) and 38.6° (111), which are characteristic to the CuO phase in correlation with the reference pattern of tenorite CuO (Card JCPDS No. 00-001-1117) and literature values for monoclinic phase CuO. The strong reflection peaks of all samples indicate the purity and high crystalline nature of the $TiO_2$ and CuO phases in the different CuO-modified $TiO_2$ nanostructures.

Figure 9:
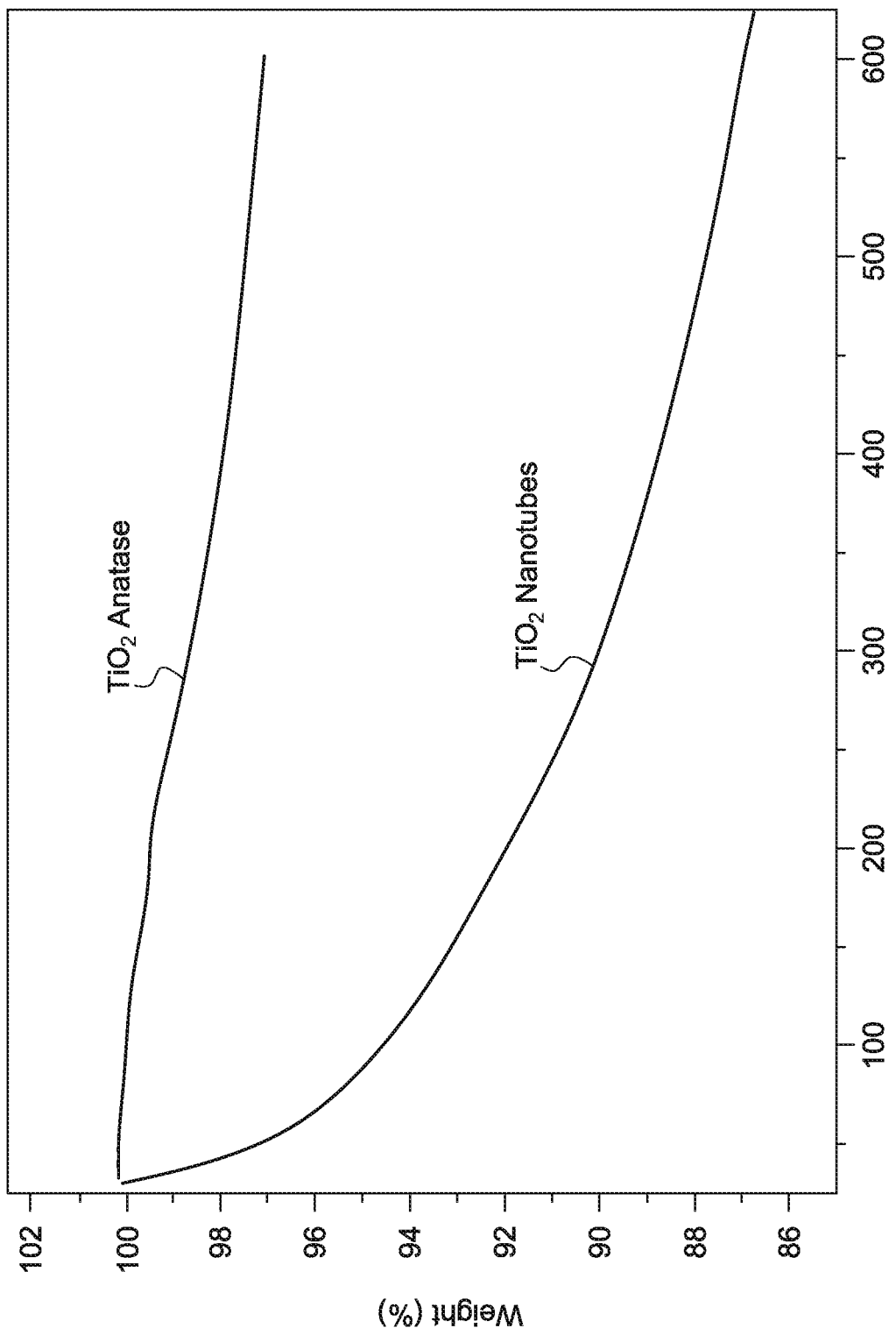
FIG. 9 is a comparison of thermal gravimetric analysis (TGA) curves of spherical anatase $TiO_2$ particles against $TiO_2$ nanotubes used in the method of making a copper oxide-titanium dioxide nanocatalyst according to the present invention.
Figure 10:
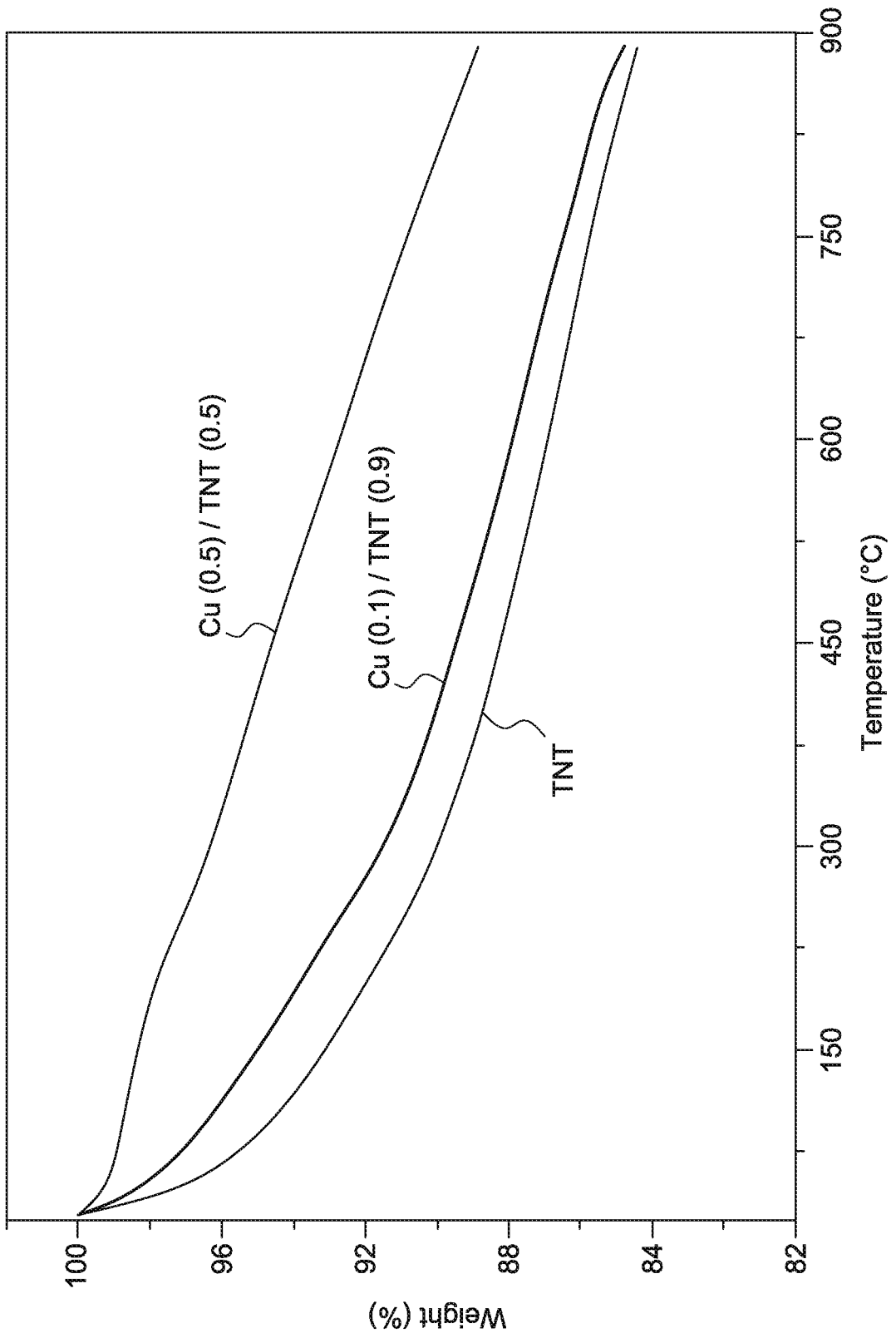
FIG. 10 is a comparison of TGA curves of unmodified $TiO_2$ nanotubes against the copper oxide-titanium dioxide nanocatalysts prepared according to the method of making a copper oxide-titanium dioxide nanocatalyst according to the present invention with varying CuO to $TiO_2$ ratios.

The weight loss from the thermal gravimetric measurements of the anatase $TiO_2$ and $TiO_2$ nanotubes are shown in FIG. 9. As can be seen, the starting spherical particles indicate no appreciable weight loss (3%) in the range of 200-600° C., but the $TiO_2$ nanotubes show a weight loss of 11.2% in the range of 50-450° C. The weight loss in the case of $TiO_2$ nanotubes is attributed to shrinkage in the interlayer spacing due to the dehydration of the water located in the interlayer spacing and adsorbed on the surface of the $TiO_2$ nanotubes below 300° C., along with the dehydration of the interlayered OH groups. Unlike $TiO_2$ nanotubes, CuO-modified $TiO_2$ (1:1) nanotubes exhibit higher thermal gravimetrical stability in the range 50-450° C. compared to the unmodified $TiO_2$ support, as can be seen in FIG. 10. The CuO-modified $TiO_2$ underwent less than 5% weight loss in the range 5-400° C. The TGA profile shows an inflection point in the weight trace at around 200° C. The Cu intercalated in the interlayer of $TiO_2$ nanotubes could interact with water in the interlayer, and consequently the water comes out from the interlayer at an instant at a high temperature over 250° C. The Cu incorporation could result in the reduction of the total number of OH groups hydrated in the interlayers of $TiO_2$ nanotubes, since Cu is hydrated with fewer numbers of OH groups relative to those hydrated to Ti.

Figure 11:
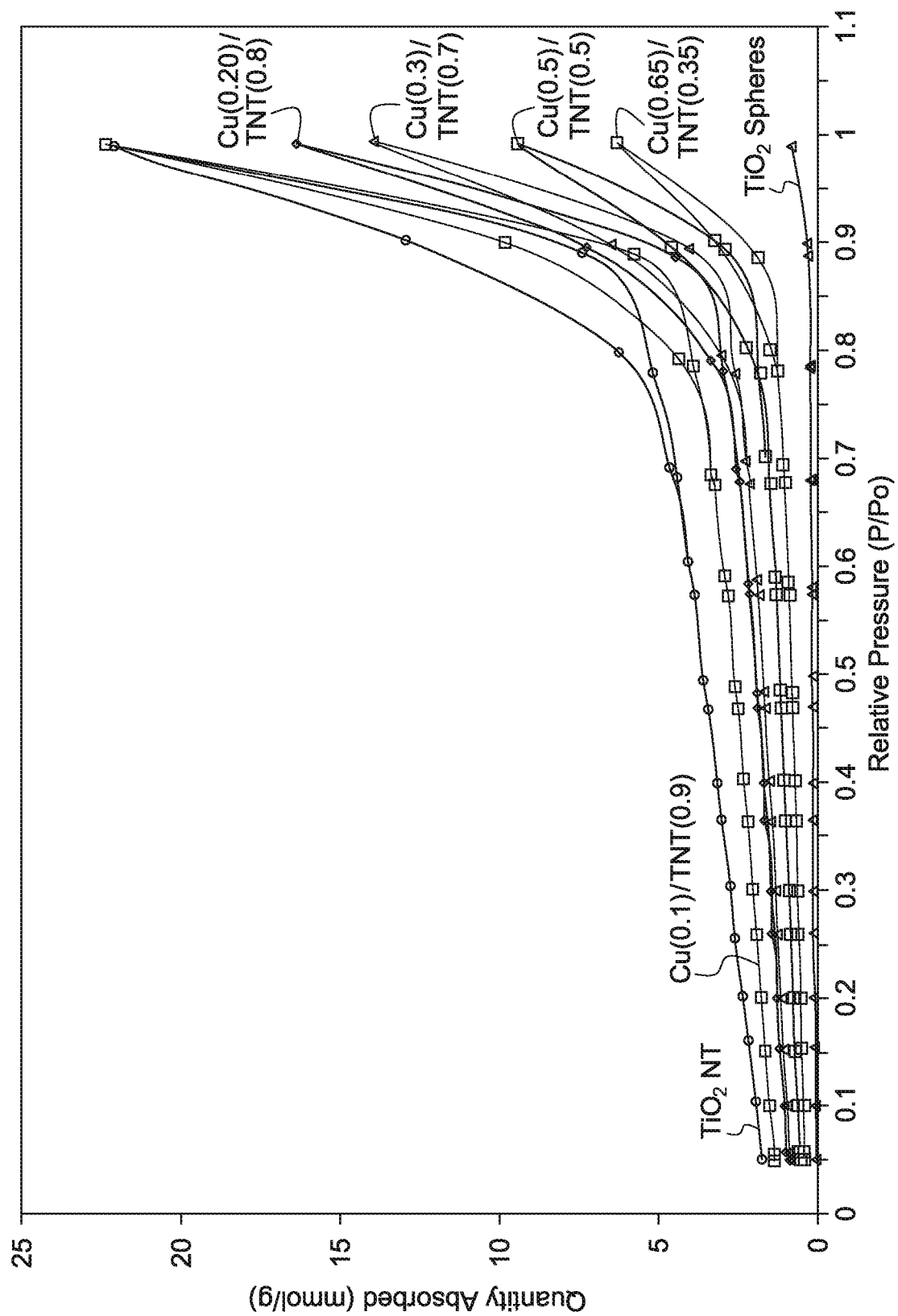
FIG. 11 is a comparison of nitrogen gas adsorption and desorption isotherms of the spherical anatase $TiO_2$ particles against the unmodified $TiO_2$ nanotubes (NTs) and a series of CuO-modified $TiO_2$ nanotubes (TNTs) prepared according to the method of making a copper oxide-titanium dioxide nanocatalyst according to the present invention with varying CuO to $TiO_2$ ratios.

FIG. 11 is a comparison of nitrogen gas adsorption and desorption isotherms of the spherical anatase $TiO_2$ particles against the unmodified $TiO_2$ nanotubes (NTs) and a series of CuO-modified $TiO_2$ nanotubes (TNTs) with varying CuO to $TiO_2$ ratios. The different samples exhibit type-IV isotherms with a distinct hysteresis loop in the range of 0.65-1.0 relative pressure, which is typical of mesoporous structured materials. The BET surface area of the $TiO_2$ nanotubes increases dramatically from 10 $m^2/g$ for the spherical $TiO^2$ particles to 183 $m^2/g$ for the $TiO_2$ nanotubes prepared by the hydrothermal treatment at 140° C. for 48 hours, which indicates that the tubular structure could enhance the surface area of the $TiO_2$ support material by contribution from the interstice and the internal space of the nanotubes. The surface area of 183 $m^2/g$ for the $TiO_2$ nanotubes is similar to that reported in the literature. The BET surface area of the CuO-modified $TiO_2$ nanotubes is lower than that of the unmodified $TiO_2$ nanotubes, and the BET surface area decreases with increasing amounts of the CuO ratio, as shown in Table 1 below.

This decrease in the surface area of the $TiO_2$ support upon incorporation of CuO is attributed to the occupying of the porous features with the CuO nanoparticles and is in agreement with trends reported in the literature. While the BET surface area is decreasing with increased amounts of CuO, there is no remarkable change in the corresponding average pore size, ranging from 21 nm to 23 nm (Table 1), which indicates the porous structure did not significantly change, thus making the CuO-modified $TiO_2$ nanotubes suitable for heterogeneous catalytic application, based on their abundant porous channels. The pore size values are in a good agreement with values reported for CuO—$TiO_2$ prepared by a spray drying process.

TABLE 1

Comparison of BET Surface Area and Pore Size

| Catalyst | BET Surface Area (m$^2$/g) | Total Pore Volume (cm$^3$/g) | Adsorption Average Pore Width (nm) |
| --- | --- | --- | --- |
| TiO$_2$ spheres | 9.1 | 0.02 | 12.6 |
| TiO$_2$ nanotubes | 183.2 | 0.76 | 16.7 |
| CuO | 33.5 | 0.30 | 35.8 |
| Cu(0.02)/TNT(0.98) | 147.5 | 0.88 | 23.9 |
| Cu(0.05)/TNT(0.95) | 133.9 | 0.86 | 25.7 |
| Cu(0.07)/TNT(0.93) | 132.2 | 0.77 | 23.4 |
| Cu(0.1)/TNT(0.9) | 132.2 | 0.77 | 23.4 |
| Cu(0.13)/TNT(0.87) | 106.2 | 0.63 | 23.7 |
| Cu(0.16)/TNT(0.84) | 107.6 | 0.61 | 22.7 |
| Cu(0.2)/TNT(0.8) | 99.9 | 0.56 | 22.7 |
| Cu(0.25)/TNT(0.75) | 113.2 | 0.43 | 15.3 |
| Cu(0.3)/TNT(0.7) | 87.2 | 0.48 | 22.2 |
| Cu(0.5)/TNT(0.5) | 60.95 | 0.32 | 21.4 |
| Cu(0.65)/TNT(0.35) | 41.3 | 0.21 | 21.2 |

Figure 12A:
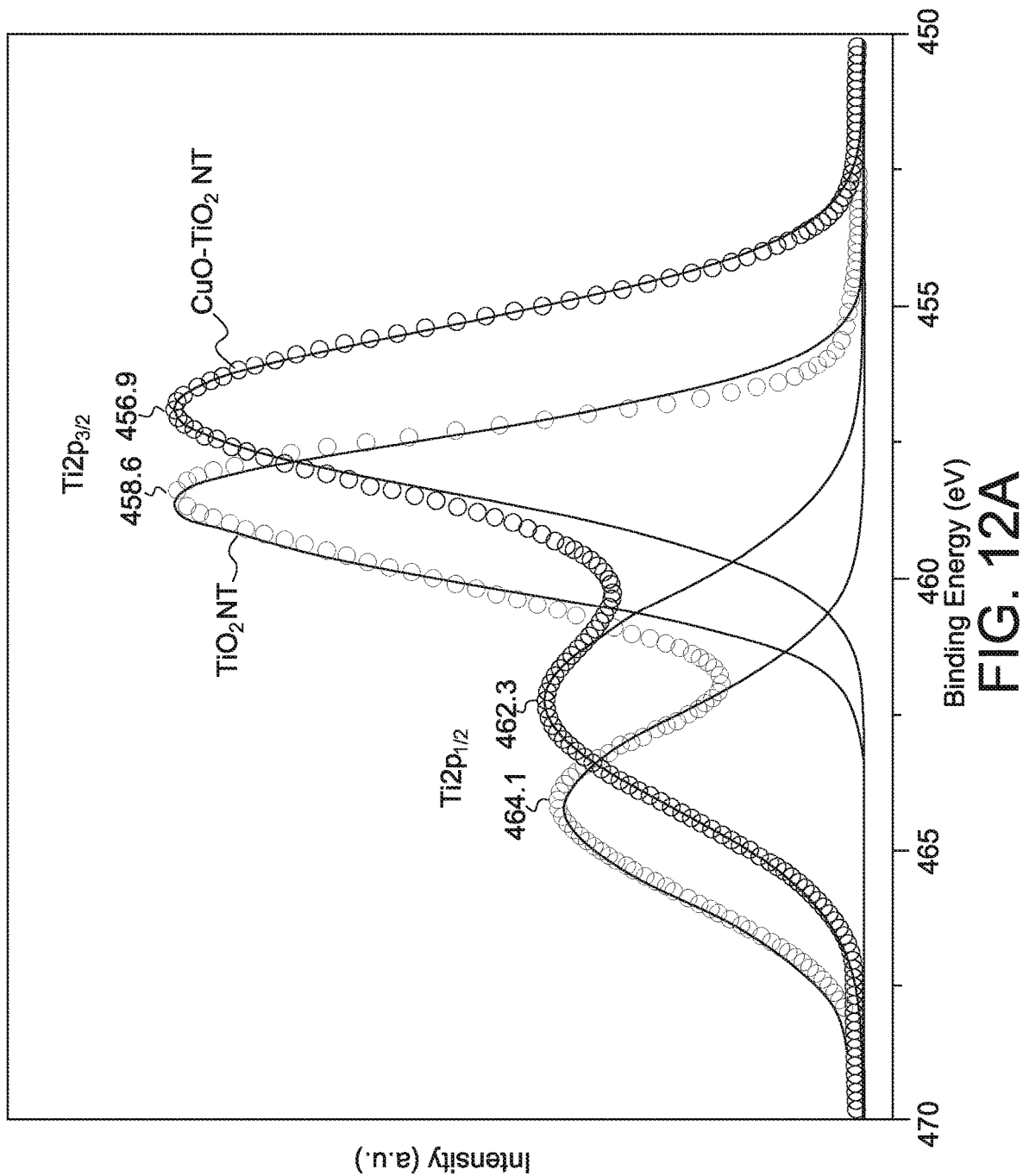
FIG. 12A is a comparison of X-ray photoelectron spectroscopy (XPS) spectra of the $TiO_2$ nanotubes and the copper oxide-titanium dioxide nanocatalyst prepared according to the method of making a copper oxide-titanium dioxide nanocatalyst according to the present invention, specifically over the Ti 2p region.
Figure 12B:
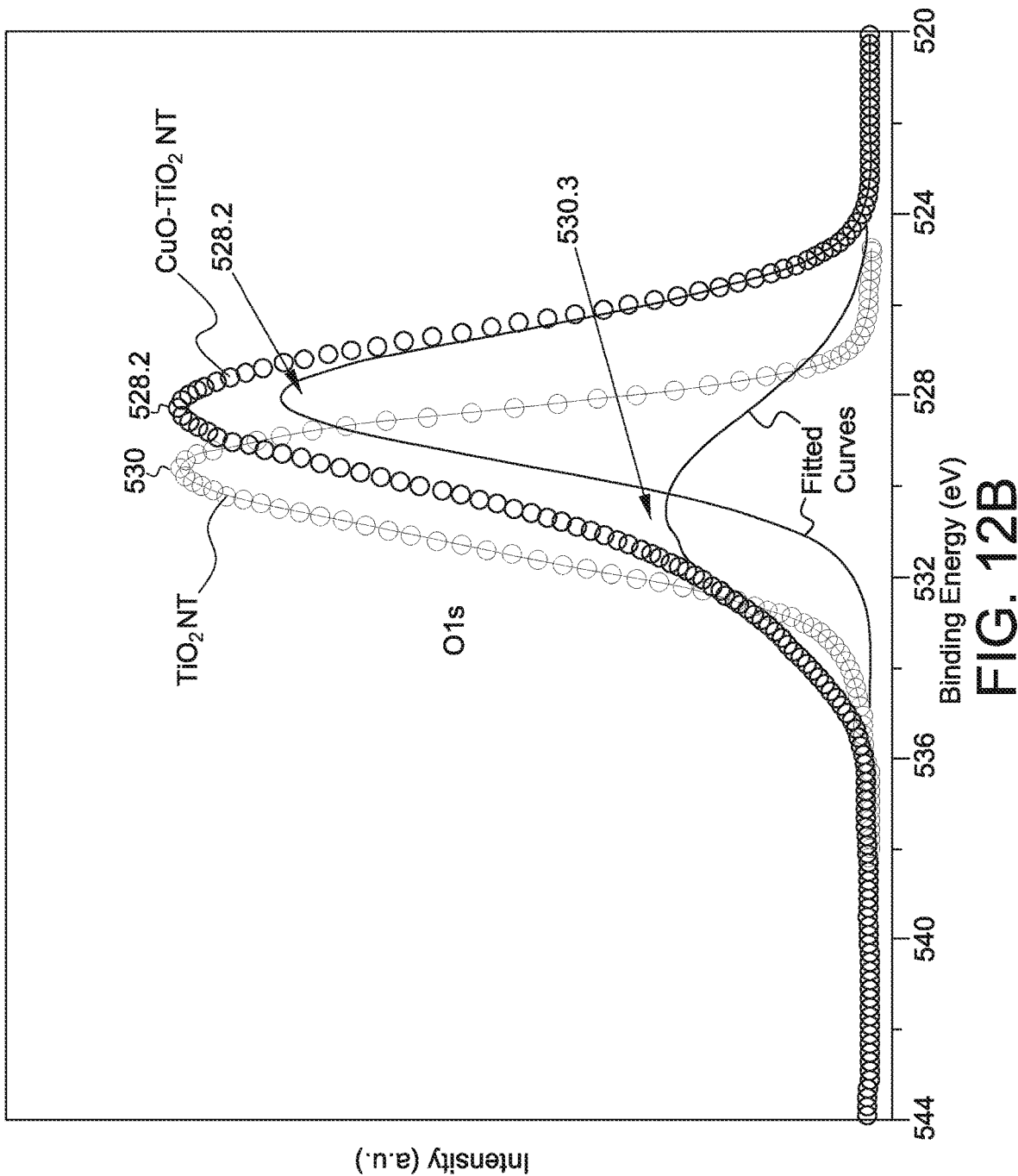
FIG. 12B is a comparison of X-ray photoelectron spectroscopy (XPS) spectra of the $TiO_2$ nanotubes and the copper oxide-titanium dioxide nanocatalyst prepared according to the method of making a copper oxide-titanium dioxide nanocatalyst according to the present invention, specifically over the O 1s region.
Figure 12C:
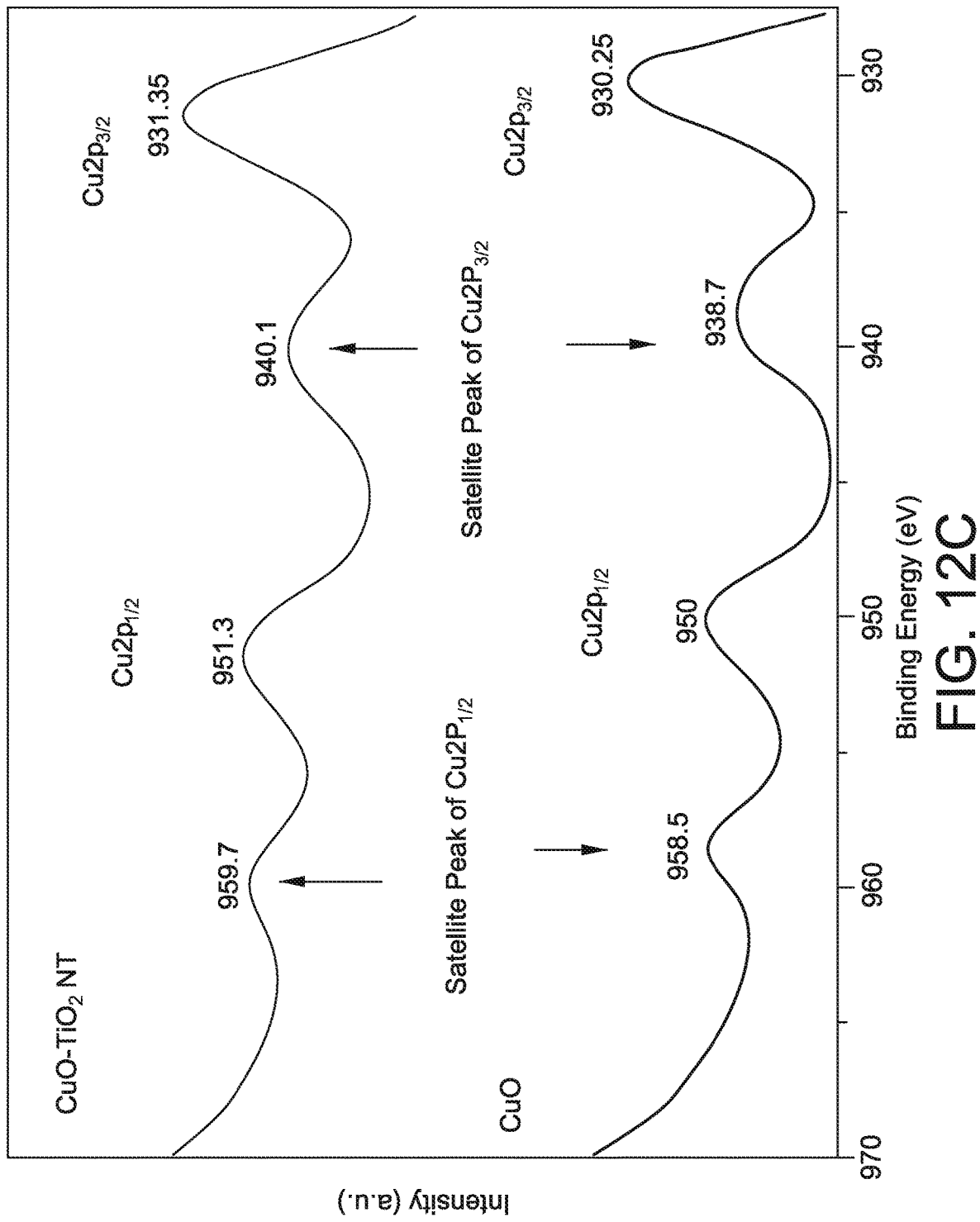
FIG. 12C is a comparison of X-ray photoelectron spectroscopy (XPS) spectra of the CuO nanoparticles and the copper oxide-titanium dioxide nanocatalyst prepared according to the method of making a copper oxide-titanium dioxide nanocatalyst according to the present invention, specifically over Cu 2p region.

X-ray photoelectron spectroscopy (XPS) measurements were carried out to investigate the chemical environment and electronic structure of Ti, O and Cu in the TiO$_2$ nanotubes, CuO nanoparticles and CuO—TiO$_2$ nanostructures, as shown in FIGS. 12A-12C. The HR-XPS scan for the Ti 2p region in TiO$_2$ was acquired from 450 to 470 eV. For the Cu 2p and O 1s regions, the HR-XPS scan was acquired from 927 to 970 eV and from 520 to 544 eV, respectively. The binding energy values are widely used to derive information on the coordination state of Ti atoms in TiO$_2$. As shown in FIG. 12A, the Ti 2p3/2 peak shifts from 456.9 eV of unmodified TiO$_2$ nanotubes to 458.6 eV for CuO-modified TiO$_2$ nanotubes (+1.7 eV lower binding energy), along with a negative shift (+1.8 eV) of the Ti 2p1/2 peak from 462.3 eV to 464.1 eV. The negative shift of both Ti 2p3/2 and Ti 2p1/2 is indicative of two distinguishable TiO$_2$ entities, which suggests a partial reduction of TiO$_2$ accompanying the formation of Ti$^{3+}$ and the increased oxygen vacancies in the CuO-modified TiO$_2$ nanotubes. The binding energies and the negative shift are in agreement with results reported for Ti$^{3+}$-doped TiO$_2$ with oxygen vacancies. The binding energies of Ti 2p peaks at 458.6 and 464.1 eV in CuO—TiO$_2$ are in a good agreement with values reported for Cu-incorporated TiO$_2$.

Figure 13:
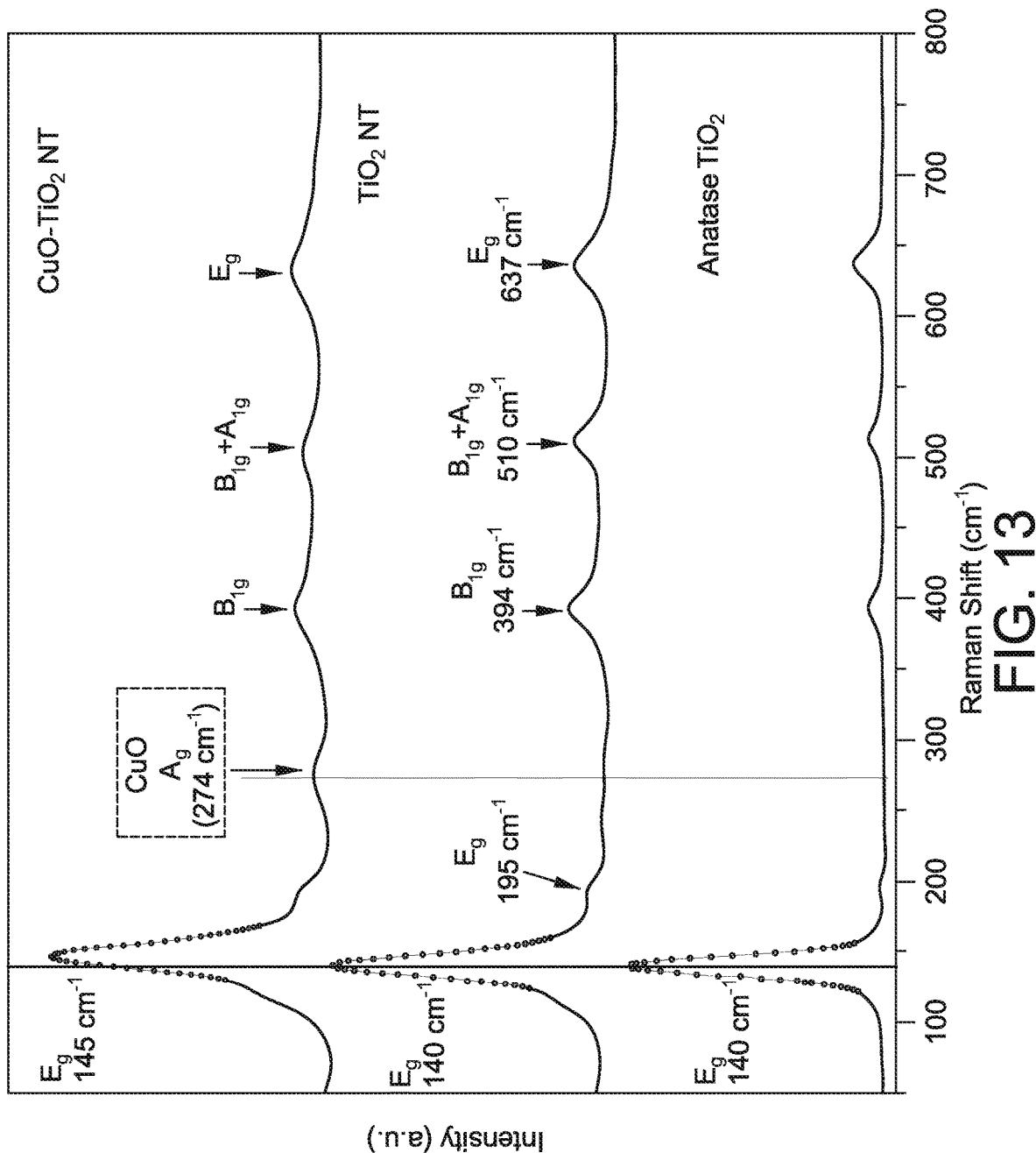
FIG. 13 is a comparison of Raman spectra of the spherical anatase $TiO_2$ particles against the unmodified $TiO_2$ nanotubes (NTs) and the CuO-modified $TiO_2$ nanotubes prepared according to the method of making a copper oxide-titanium dioxide nanocatalyst according to the present invention.

The formation of oxygen vacancies and the existence of Ti$^{3+}$ in the CuO-modified TiO$_2$ nanotubes were also confirmed by the upshift of the E$_g$ mode of the CuO-modified TiO$_2$ compared to unmodified TiO$_2$ nanotubes, as presented in the Raman spectra shown in FIG. 13. Based on the Raman results, the up-shift (blue shift) of the E$_g$ mode, which is characteristic of crystalline anatase TiO$_2$ from 140 to 145 cm$^{-1}$ after CuO modification, is primarily due to the higher concentration of oxygen vacancies in the CuO-modified TiO$_2$ nanotubes. Because of the negative shift of XPS peaks of Ti 2p and the blue shift of the E$_g$ Raman mode of TiO$_2$, it is reasonable to conclude the reduction of Ti$^{4+}$ by the free electrons left from the oxygen vacancies and the existence of a significant amount of Ti$^{3+}$ ions in the CuO-modified TiO$_2$ nanotubes. It should be noted that the energy difference between XPS Ti2p 3/2 and Ti2p 1/2 peaks for the CuO-modified TiO$_2$ nanotubes is 5.5 eV, comparable to that of the unmodified TiO$_2$ nanotubes, which is 5.4 eV and in agreement with literature values, confirming the existence of a single phase of anatase in both samples.

FIG. 12B shows the high resolution XPS spectra of oxygen for the unmodified TiO$_2$ and CuO-modified TiO$_2$ nanotubes. In the case of pure TiO$_2$ nanotubes, an intense O is peak centered at 530 eV is observed and is attributed to the lattice O$^{2-}$ anions bonding to the metal cations in the Ti—O bond, which is in agreement with values reported for bulk oxygen in anatase TiO$_2$. As shown in FIG. 12B, for CuO-modified TiO$_2$ nanotubes, the O 1s peak shifts from 530 eV to 528.2 eV, accompanied by an O 1s peak broadening, as well as the appearance of a relatively weak shoulder peak shifted at a higher binding energy of 530.3 eV, which is most likely due to the presence of adsorbed oxygen anions and the oxygen in the hydroxyl (OH—) groups on the surface, or the oxygen in the CuO. The observation of a weak O 1s peak at a slightly higher binding energy after modification of TiO$_2$ with CuO is in agreement with the results reported for O 1s peaks of pure TiO$_2$ and Cu-modified TiO$_2$, as well as a trend observed for CuO supported on doped TiO$_2$. The downshift of the Ti—O XPS peak to a lower binding energy for CuO-modified TiO$_2$ nanotubes is similar to the shift to lower binding energy observed for reduced TiO$_2$ with oxygen vacancies.

FIG. 12C shows the XPS high-resolution spectra of the Cu 2p region in CuO and in CuO—TiO$_2$. The binding energies of Cu$^{2+}$ XPS peaks are slightly higher for CuO supported on TiO$_2$ nanotubes than the pure unsupported CuO nanoparticles. The peaks of Cu (2p3/2) and Cu (2p1/2) were centered at 931.3 eV and 951.3 eV, respectively, in the case of TiO$_2$-supported CuO. The upshift of the Cu 2p peaks to higher binding energies for TiO$_2$-supported CuO is in agreement with the literature and possibly indicates the strong interaction between the CuO nanoparticles and the TiO$_2$ nanotube support.

The structural phases of TiO$_2$ and CuO can be sensitively identified from Raman scattering analysis based on their characteristic Raman bands. FIG. 13 shows the Raman spectra of anatase TiO$_2$, TiO$_2$ nanotubes prepared by the above method, and CuO-modified TiO$_2$ nanotubes. Anatase TiO$_2$ is tetragonal and belongs to the space group D$_{4h}$ with two TiO$_2$ chemical formula units (six atoms) in each primitive unit cell. According to the factor group analysis, there are three IR active modes and six Raman active modes, namely (1A$_{1g}$+2B$_{1g}$+3E$_g$) associated with the Ti—O stretching, bending vibration. The six allowed vibrational modes in the first-order Raman spectrum of anatase TiO$_2$ are identified as three Eg modes associated with the symmetric vibration of O—Ti—O in TiO$_2$, two B$_{1g}$ modes due to the symmetric bending vibration of O—Ti—O, and one A$_{1g}$ mode resulting from the antisymmetric bending vibration of O—Ti—O.

The first E$_g$ mode value associated with the symmetric vibration of O—Ti—O in TiO$_2$ is found to be 140 for the TiO$_2$ nanotubes and 145 for the CuO—TiO$_2$ nanocatalyst, which is in good agreement with the values of 142 and 143, respectively, found in the literature. The second E$_g$ mode value associated with the symmetric vibration of O—Ti—O in TiO$_2$ is found to be 195 for the TiO$_2$ nanotubes, which is in good agreement with values of 194 and 196, found in the literature. The third E$_g$ mode value associated with the symmetric vibration of O—Ti—O in TiO$_2$ is found to be 637 for the TiO$_2$ nanotubes, which is in good agreement with values of 636 and 637 found in the literature.

The B$_{1g}$ value associated with the symmetric bending of O—Ti—O in TiO$_2$ is found to be 394 for the TiO$_2$ nanotubes, which is in good agreement with the values of 393 and 395 found in the literature. The A$_{1g}$+B$_{1g}$ value associated with the antisymmetric bending vibration of O—Ti—O in TiO$_2$ is found to be 510 for the TiO$_2$ nanotubes, which is in good agreement with the value of 514 found in the literature. The Ag value for the Cuo-TiO$_2$ nanocatalyst is found to be 274.

Figure 14:
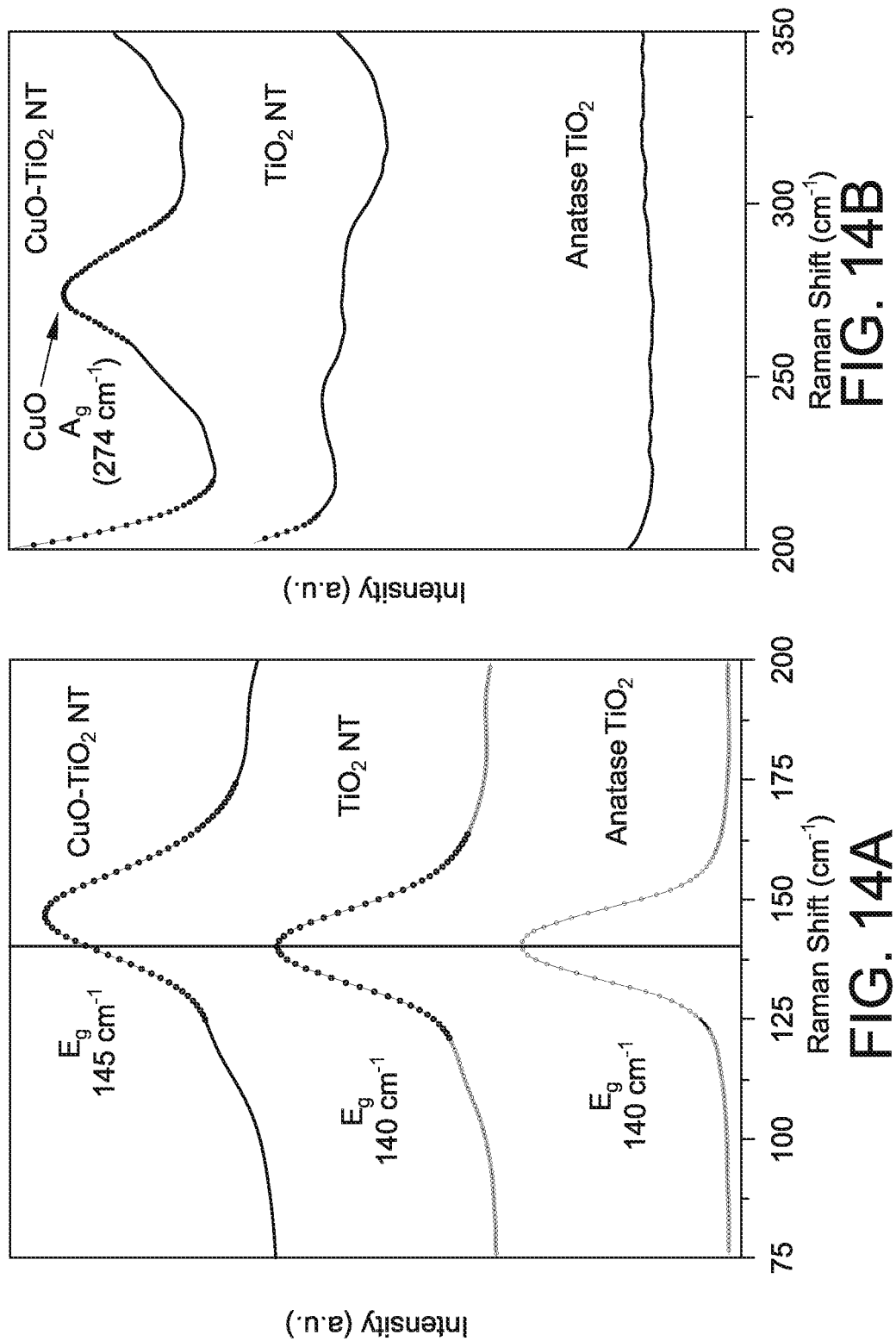
FIG. 14A is a comparison of the Raman spectra of the spherical anatase $TiO_2$ particles against the unmodified $TiO_2$ nanotubes (NTs) and the CuO-modified $TiO_2$ nanotubes prepared according to the method of making a copper oxide-titanium dioxide nanocatalyst according to the present invention, specifically showing a shift of the $E_g$ peak.
FIG. 14B is a comparison of the Raman spectra of the spherical anatase $TiO_2$ particles against the unmodified $TiO_2$ nanotubes (NTs) and the CuO-modified $TiO_2$ nanotubes prepared according to the method of making a copper oxide-titanium dioxide nanocatalyst according to the present invention, specifically showing the appearance of a CuO peak.

In the present case, the Raman spectrum exhibits five pronounced peaks at 140 cm$^{-1}$ ($E_g$), 194 cm$^{-1}$ ($E_g$), 393 cm$^{-1}$ ($B_{1g}$), 514 cm$^{-1}$ ($A_{1g}+B_{1g}$) and 637 cm$^{-1}$ ($E_g$), in addition to a weak combination band/broad feature at 125 cm$^{-1}$. The intense $E_{2g}$ peak at 140 cm$^{-1}$, the two low-intensity $E_g$ peaks at 195 cm$^{-1}$ and 637 cm$^{-1}$ and other broad peaks at 394 cm$^{-1}$ and 510 cm$^{-1}$, corresponding to $B_{1g}$ and $A_{1g}+B_{1g}$, respectively, confirm the anatase phase of the TiO$_2$ nanotubes and are in good agreement with values reported in the literature. The intense $E_{2g}$ peak associated with the symmetric stretching vibration of O—Ti—O in TiO$_2$ is broadened and shifted to a high wavenumber in the case of CuO-modified TiO$_2$ nanotubes. The $E_g$ band is shifted to a higher wavenumber along with an increase in line width, as indicated by the full width at half maximum (FWHM) when CuO is added, as shown in FIGS. 14A and 14B.

The upshift may be attributed to phonon confinement and nonstoichiometric defects in nanosized TiO$_2$ upon modification with the CuO phase, which could have resulted in structural distortion on the crystal lattice of TiO$_2$ nanotubes after the CuO loading, thus indicating a strong interaction between CuO and the TiO$_2$ support. Doping TiO$_2$ with different metallic dopant species induces structural changes, resulting in higher wavenumbers and the broadening due to size decrease, in agreement with the literature for Cu-doped TiO$_2$ and Cr$^{3+}$ doped TiO$_2$. The ionic size of Cu$^{2+}$ (0.73 Å) is larger than that of Ti$^{4+}$ (0.64 Å), thus the incorporation of Cu ions will distort the lattice structure of TiO$_2$.

Additionally, there might be oxygen vacancies in the TiO$_2$ lattice upon Cu incorporation due to the charge difference between Cu$^{2+}$ and Ti$^{4+}$ so that the charge neutrality is maintained. This result is confirmed by the XPS analysis of FIGS. 12A-12C. If the Ti—O—Ti bond is disturbed by formation of new Cu—O—Ti or Cu—O—Cu bonds due to the doping/loading of Cu on the substitutional position on the Ti$^{4+}$ site, this will disturb the Ti—O—Ti bonds, and the formation of new Cu—O bonds will affect the Raman active modes, leading to broadening and shifting of the peaks. Although Cu$^{2+}$ incorporation/doping on the Ti$^{4+}$ site is expected to affect the entire Raman active modes, it has been observed that the effect is more intense for the $E_g$ peak. In the case of CuO-modified TiO$_2$, this vibration lowers, since the oxygen vacancy could be formed nearby. Such formation of oxygen vacancies results in lattice contraction and causes peak shift to higher wavenumber, along with peak broadening.

Further, the quantum size effect has been shown to play a role in broadening and peak shift. This is also possible in the present case, since the CuO is in the nanoscale regime, as indicated by TEM and XRD results, so the phonon confinement will be prominent. Therefore, both phonon confinement and structural defects may result in the shifting and broadening of the Raman $E_g$ peak, primarily due to the oxygen vacancy generation and lattice disruption of CuO—TiO$_2$. FIGS. 14A and 14B show that $B_{1g}$ and $A_{1g}$ Raman peaks of TiO$_2$ nanotubes and CuO-modified TiO$_2$ nanotubes are identical, and the position/intensity of the Raman vibration modes were not influenced by the CuO loading on the surface of the TiO$_2$ nanotubes. They had the same peak positions/shifts as that of the TiO$_2$ anatase. In addition to the scattering peaks, which are assigned to the anatase phase of TiO$_2$, another peak centered at 274 cm$^{-1}$ is observed and is attributed to the copper oxide phase, which is in good agreement with the value reported in the literature.

Figure 15:
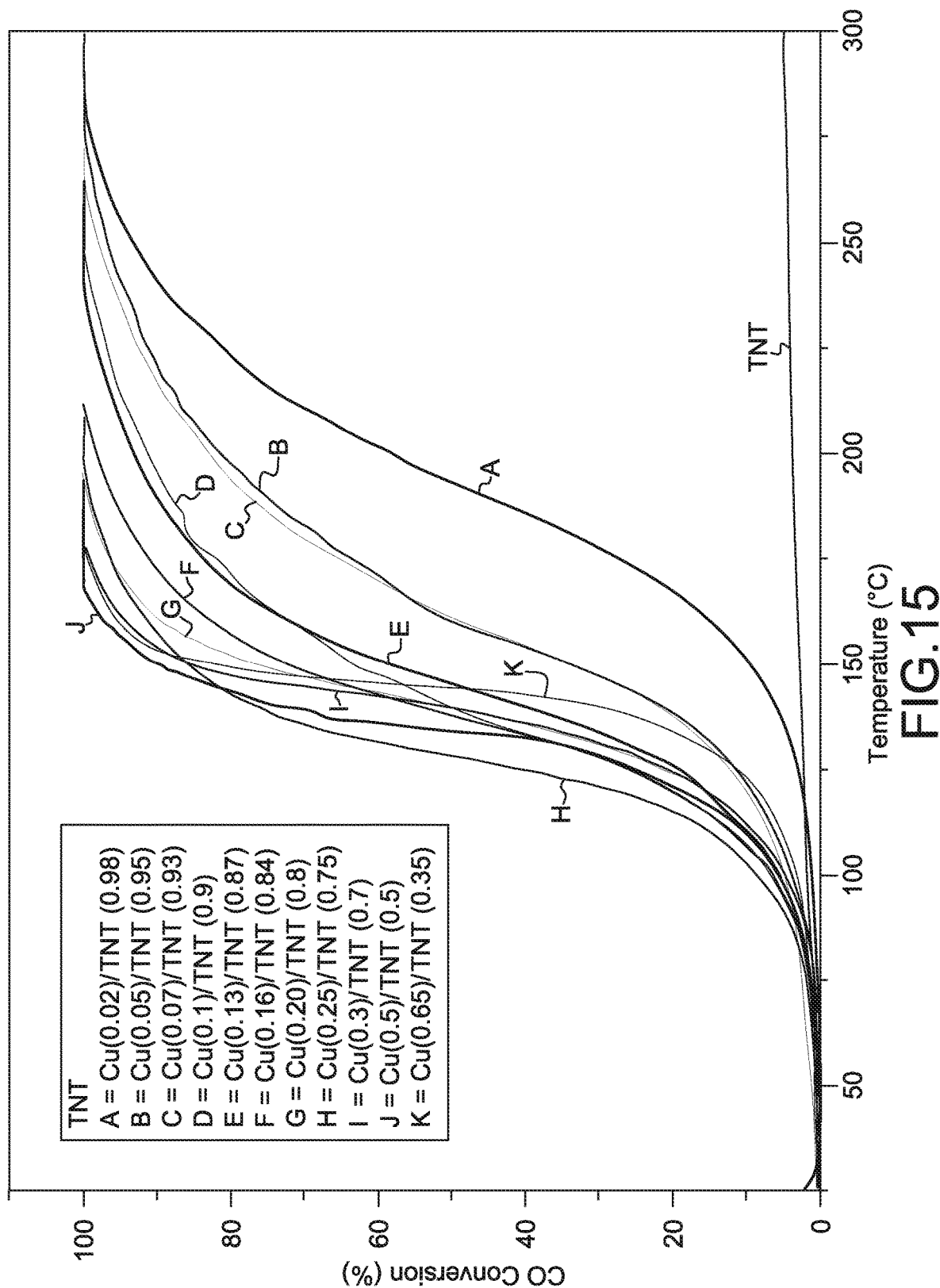
FIG. 15 is a comparison of plots of carbon monoxide (CO) conversion-temperature light-off curves for unmodified $TiO_2$ nanotubes (TNTs) and a series of CuO-modified $TiO_2$ nanotubes prepared according to the method of making a copper oxide-titanium dioxide nanocatalyst according to the present invention with varying CuO to $TiO_2$ ratios as measured by the experimental apparatus of FIG. 1.
Figure 16:
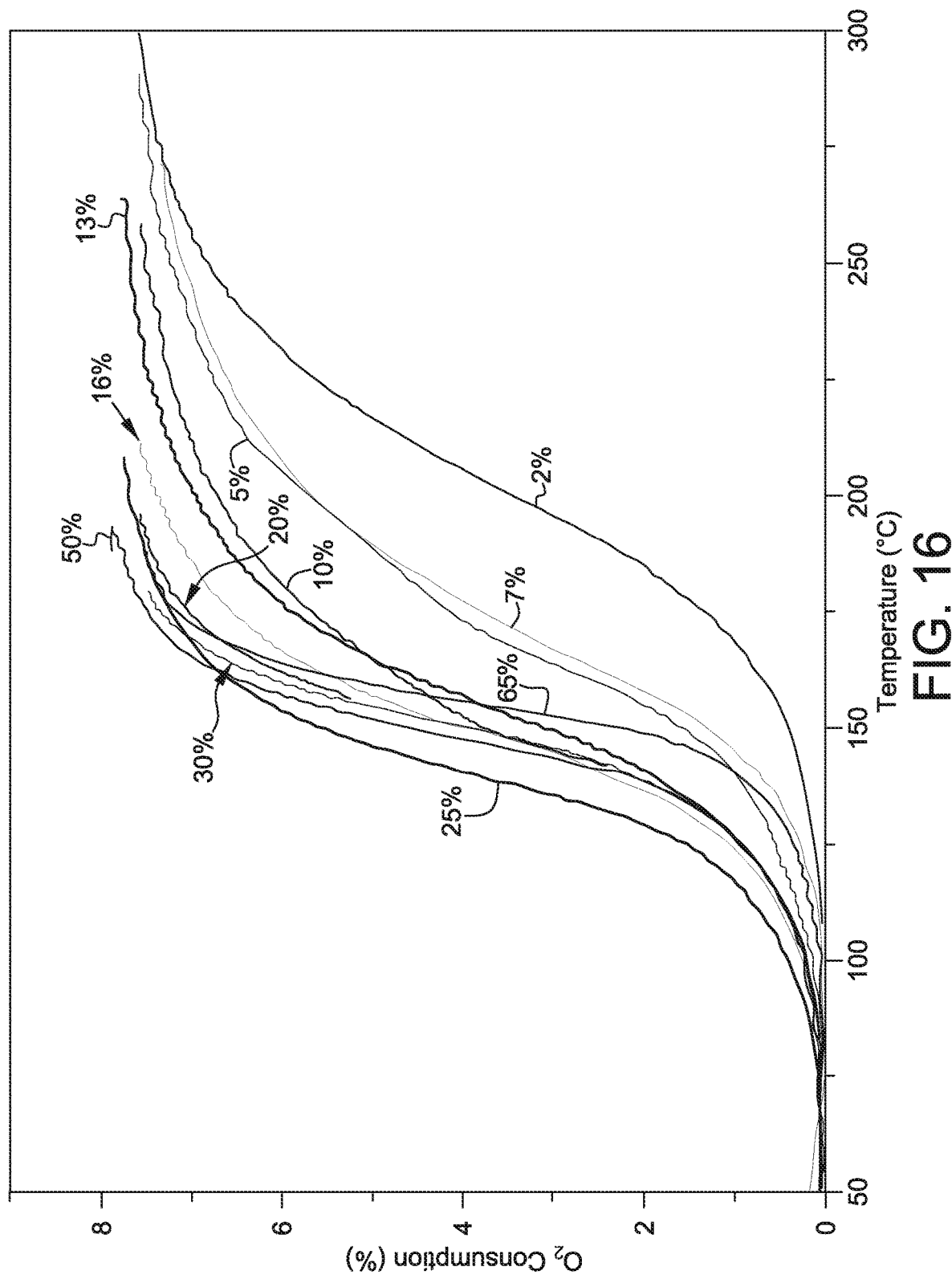
FIG. 16 is a comparison of plots of oxygen ($O_2$) consumption-temperature light-off curves for a series of CuO-modified $TiO_2$ nanotubes prepared according to the method of making a copper oxide-titanium dioxide nanocatalyst according to the present invention with varying CuO to $TiO_2$ ratios as measured by the experimental apparatus of FIG. 1.
Figure 17:
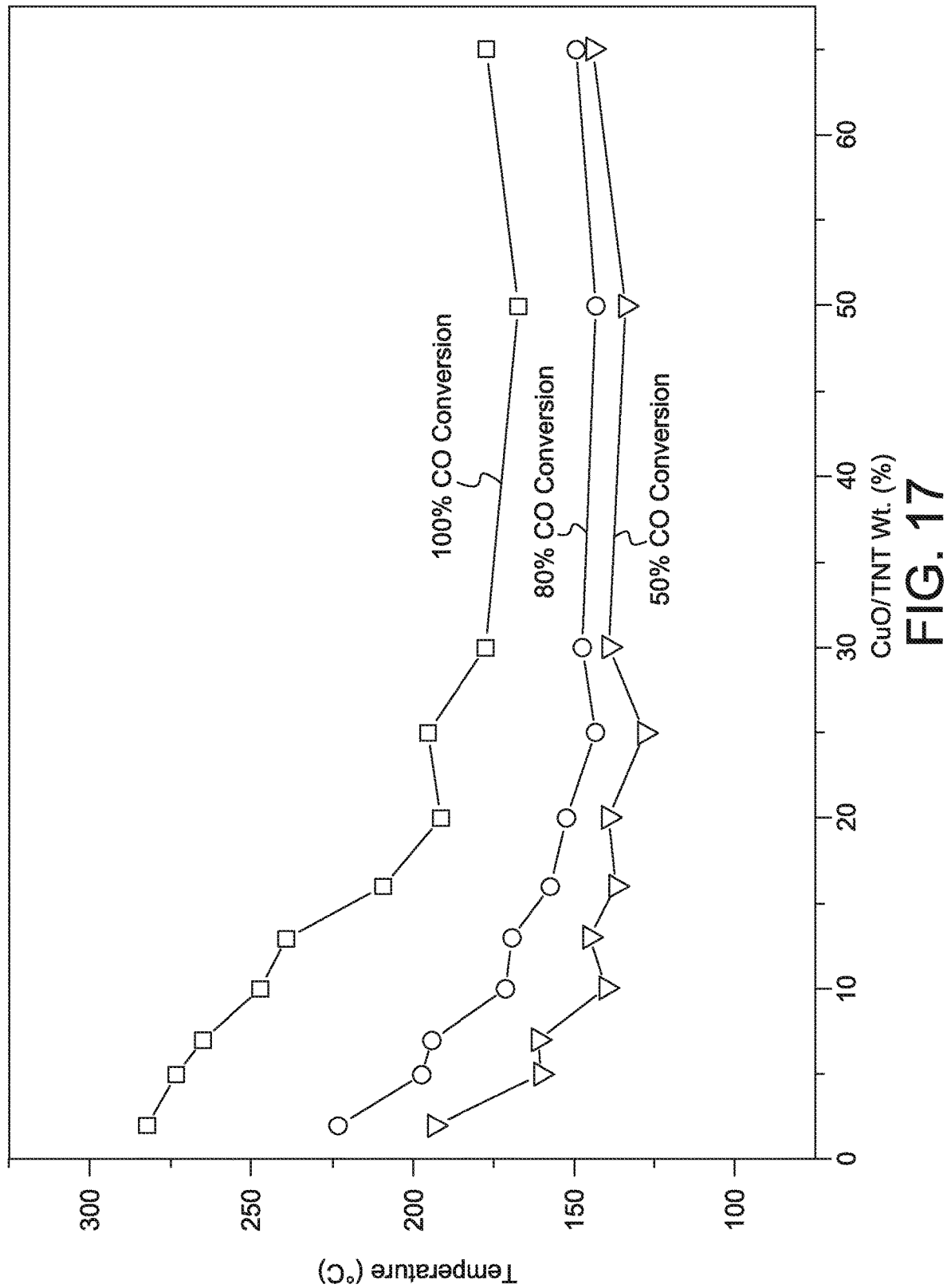
FIG. 17 is a comparison of plots of carbon monoxide (CO) conversion, showing temperature as a function of $CuO/TiO_2$ nanotube weight ratio for nanocatalysts prepared according to the method of making a copper oxide-titanium dioxide nanocatalyst according to the present invention as measured by the experimental apparatus of FIG. 1.

FIG. 15 compares carbon monoxide (CO) light-off curves for unmodified TiO$_2$ nanotubes (TNTs) and a series of CuO-modified TiO$_2$ nanotubes with varying CuO to TiO$_2$ ratios, as measured by the experimental apparatus of FIG. 1. Similarly, FIG. 16 compares oxygen (O$_2$) light-off curves for the series of CuO-modified TiO$_2$ nanotubes with varying CuO to TiO$_2$ ratios, shown here as wt % of CuO in the nanocatalyst, as measured by the experimental apparatus of FIG. 1. FIG. 17 compares carbon monoxide (CO) conversion temperatures for the CuO-modified TiO$_2$ nanotubes with varying CuO to TiO$_2$ ratios, expressed here as wt % of CuO in the nanocatalyst. The CO oxidation light-off curve for the unmodified TiO$_2$ nanotubes did not show significant activity below 400° C., and that measured for copper oxide nanoparticles alone showed an appreciable activity only above 250° C. Thus, the catalytic CO conversion measured on the copper oxide-titanium dioxide nanocatalysts is ascribed to the synergistic interplay between copper oxide and titanium dioxide counterparts due to the strong interaction at the interface, as indicated from the XPS and Raman studies shown in FIGS. 12A-13. The copper oxide loading enhances the concertation of the oxygen vacancies and thus results in lower CO conversion temperatures. This enhanced formation of oxygen vacancies in copper oxide-titanium dioxide nanocatalysts was evidenced from XPS and Raman studies, as described above.

Figure 18:
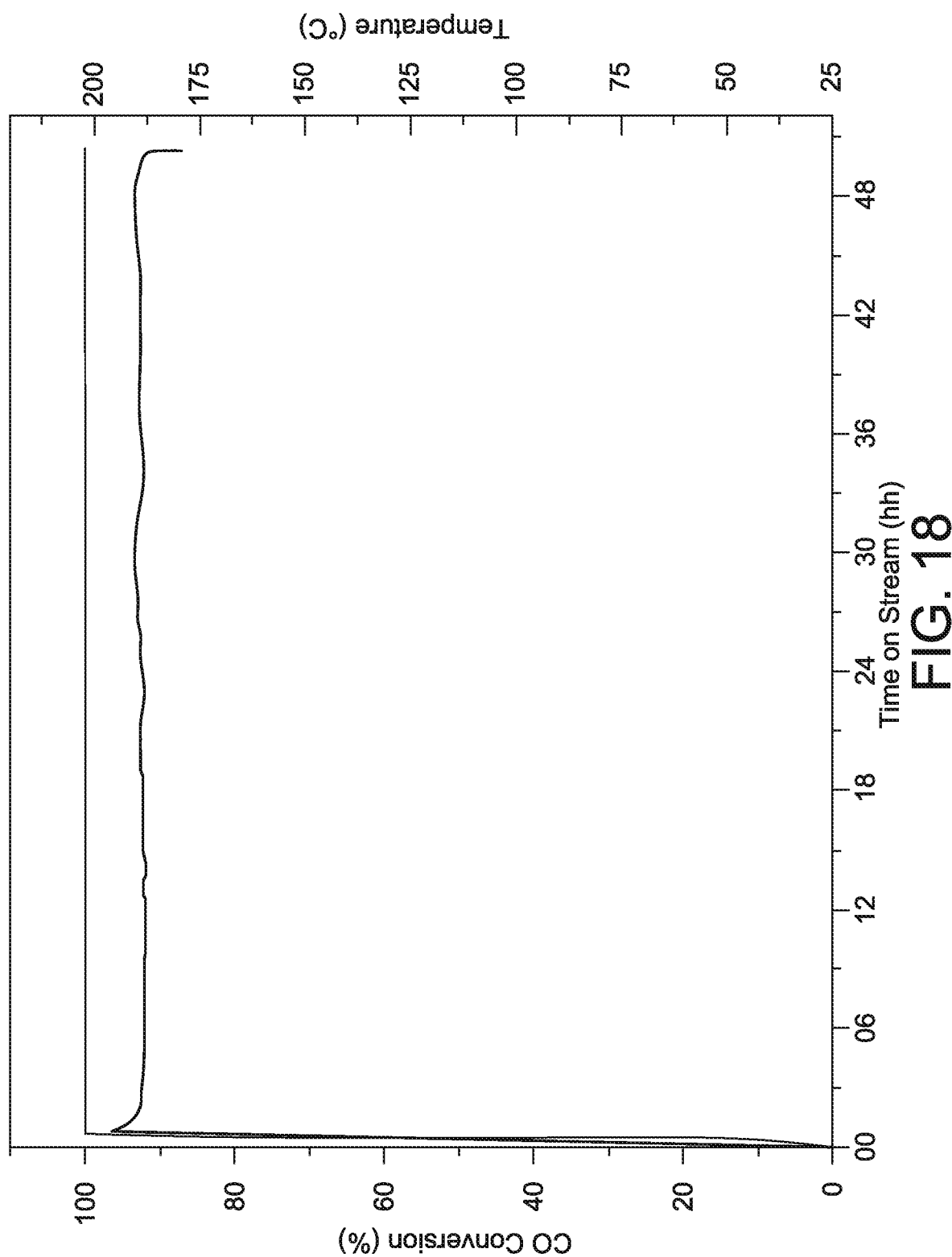
FIG. 18 shows a stability curve of carbon monoxide (CO) oxidation over the copper oxide-titanium dioxide nanocatalyst prepared according to the method of making a copper oxide-titanium dioxide nanocatalyst according to the present invention at a temperature of 180° C. over a period of 48 hours as measured by the experimental apparatus of FIG. 1.

FIG. 18 shows a stability curve of carbon monoxide (CO) oxidation over the copper oxide-titanium dioxide nanocatalyst at a temperature of 180° C. over a period of 48 hours. The long-term stability for CO oxidation was evaluated by keeping the catalyst under a continuous stream of the feed gas mixture, containing 4 vol % CO. The high activity demonstrated by the catalysts is not subject to deactivation, as indicated by the stable performance of the of CO conversion for the entire test period.

Figure 19A:
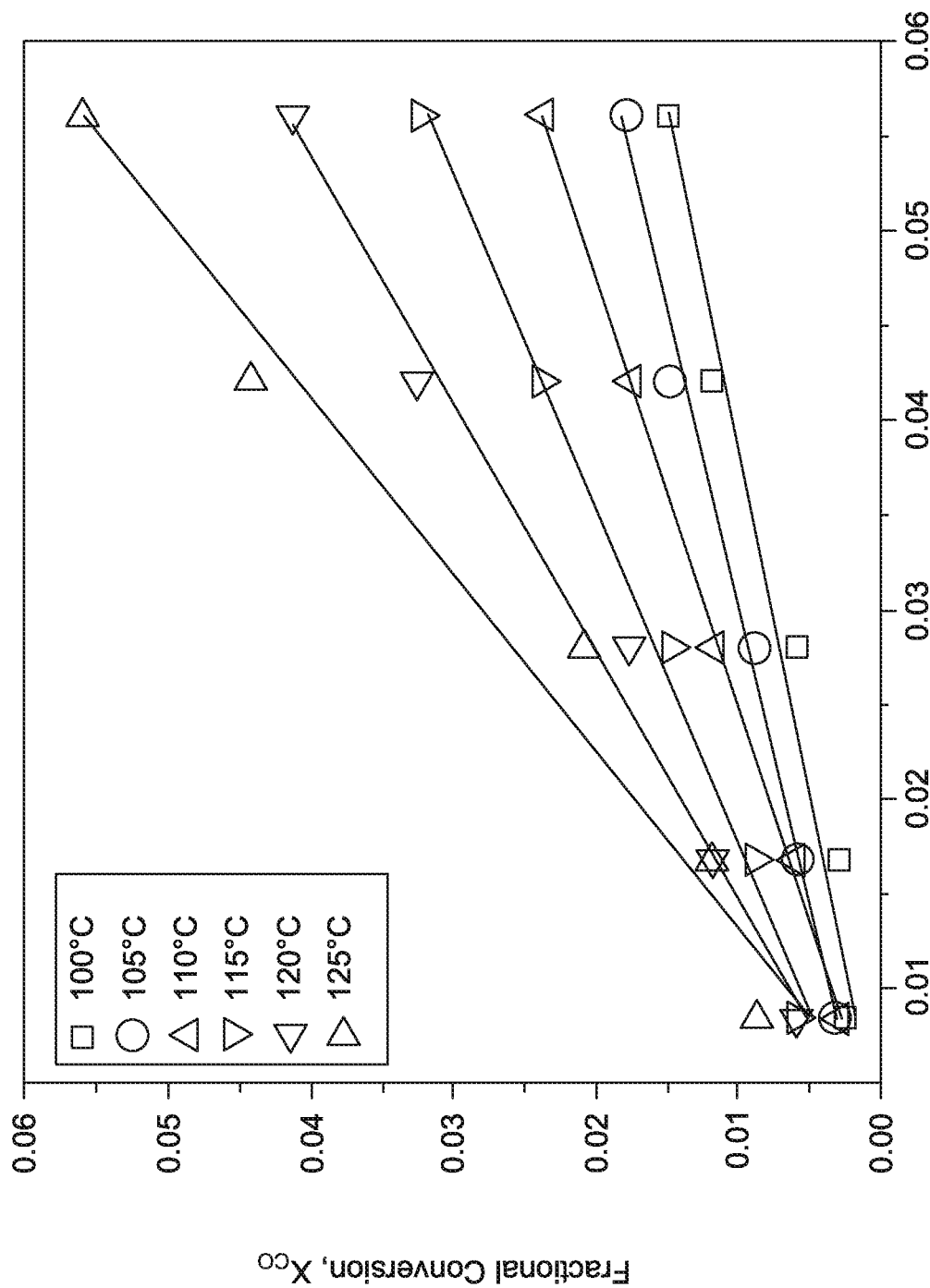
FIG. 19A shows the variation of the CO fractional conversion as a function of the mass (W) to molar flow ($F_{CO}$) ratio for copper oxide-titanium dioxide nanocatalysts with 2 wt % CuO.
Figure 19C:
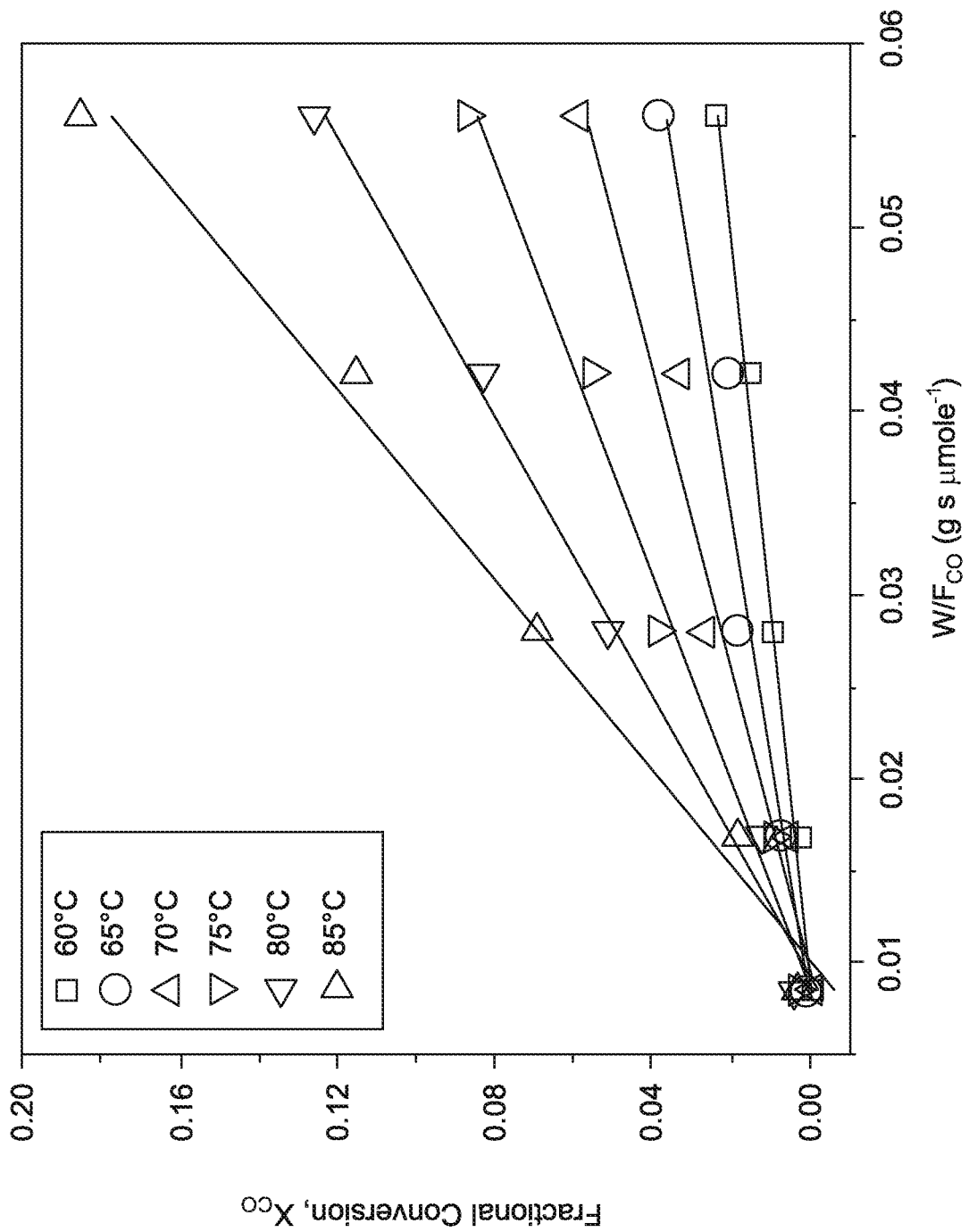
FIG. 19C shows the variation of the CO fractional conversion as a function of the mass (W) to molar flow ($F_{CO}$) ratio for copper oxide-titanium dioxide nanocatalysts with 50 wt % CuO.
Figure 19D:
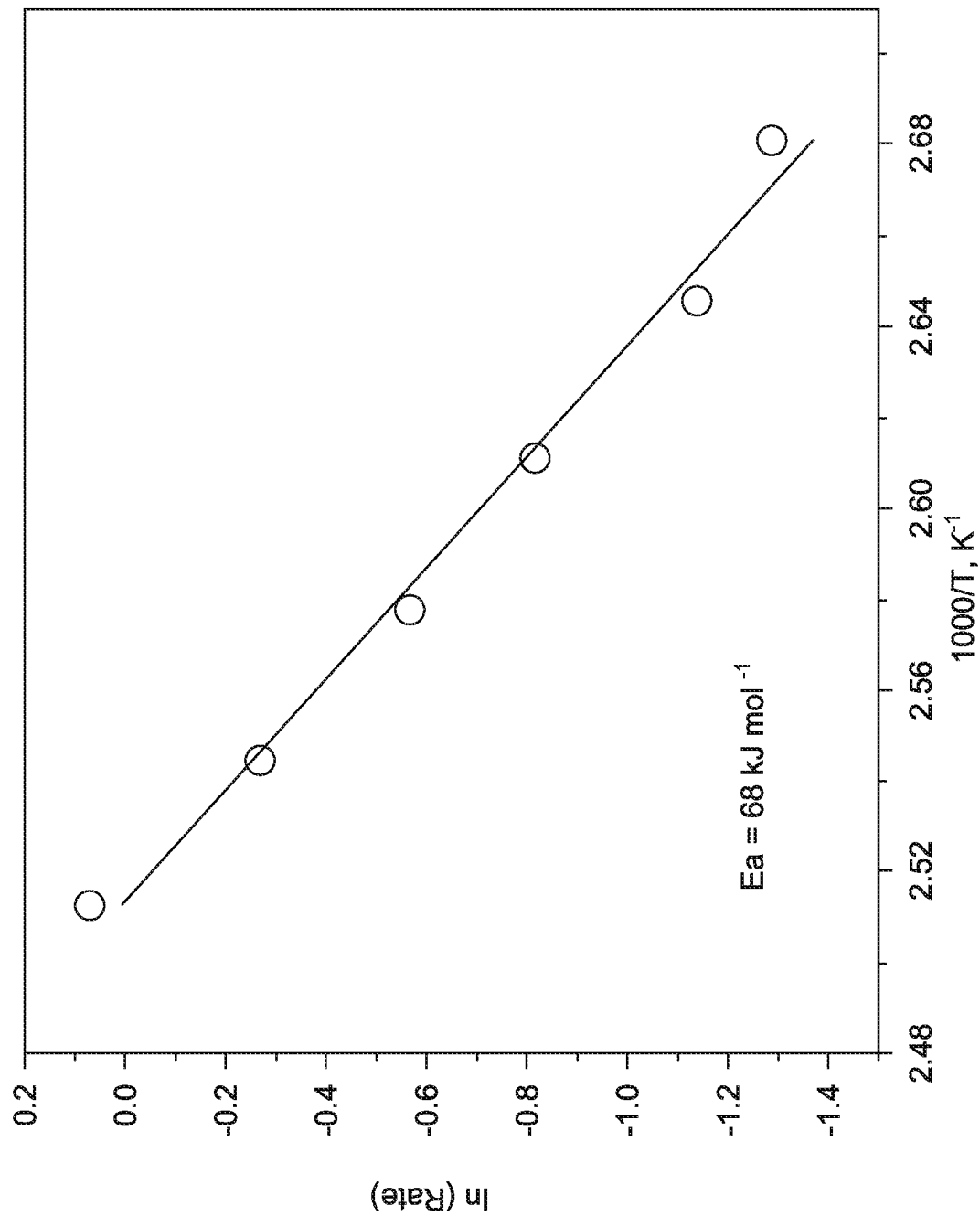
FIG. 19D shows the Arrhenius plot for copper oxide-titanium dioxide nanocatalysts with 2 wt % CuO.
Figure 19E:
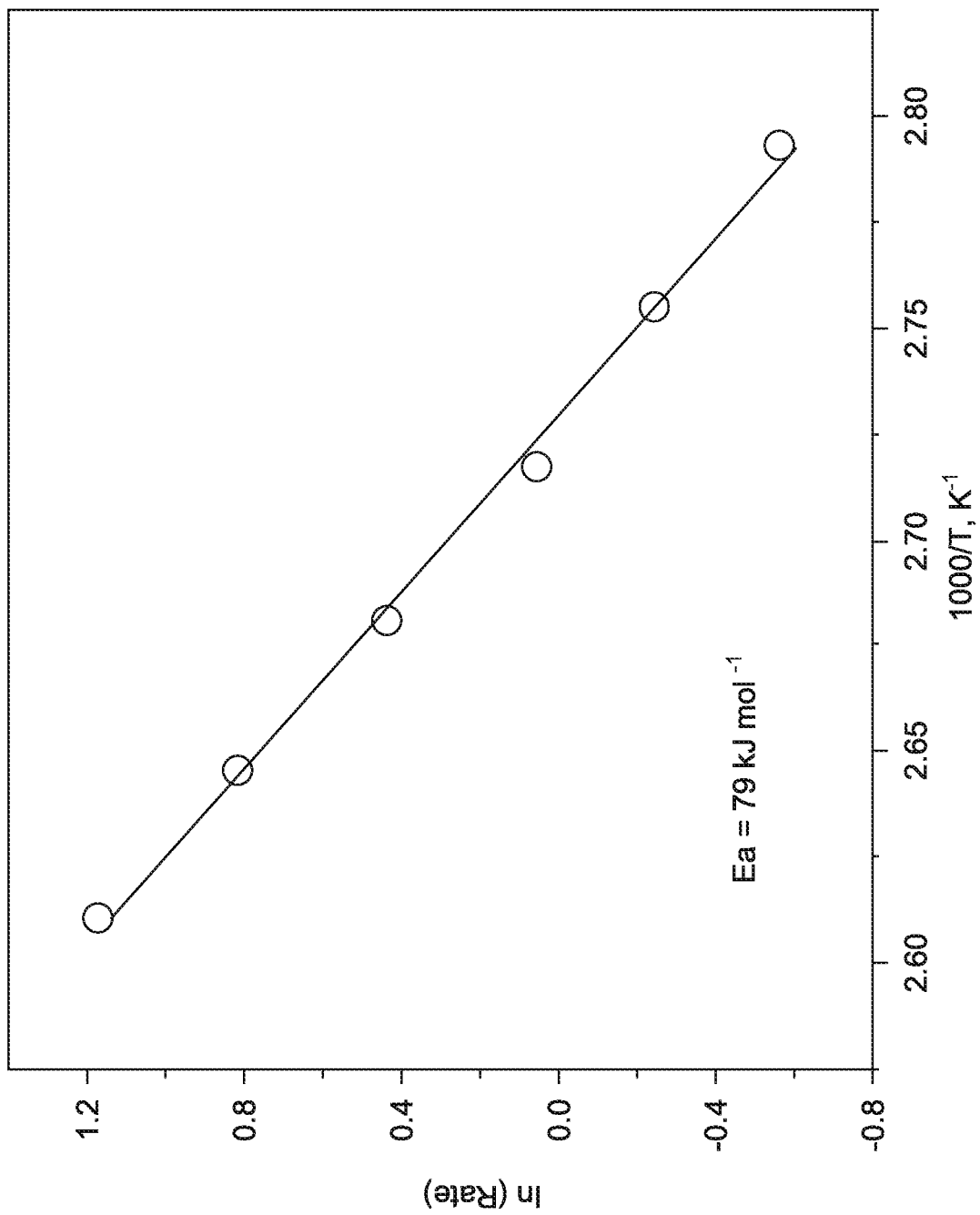
FIG. 19E shows the Arrhenius plot for copper oxide-titanium dioxide nanocatalysts with 20 wt % CuO.
Figure 19F:
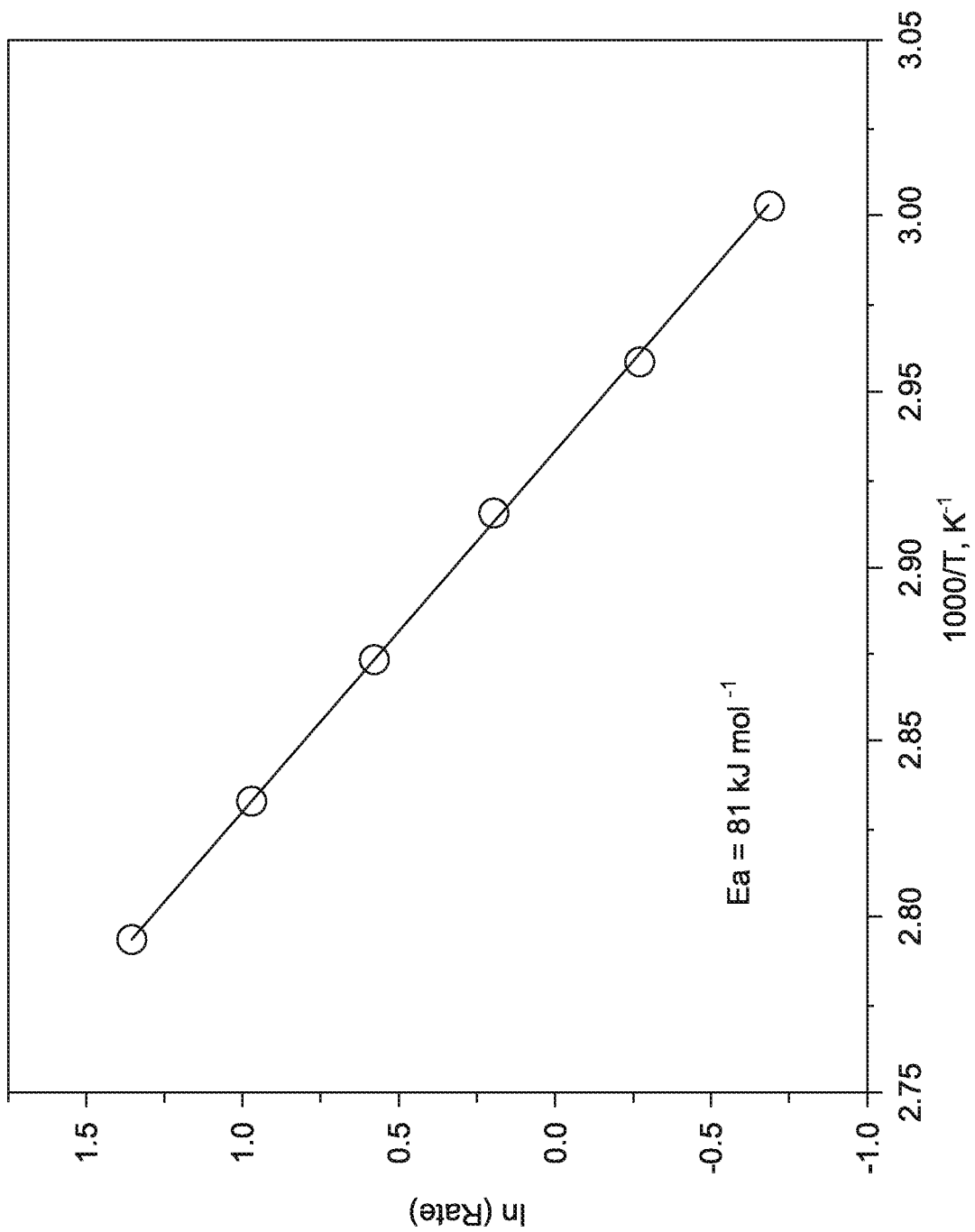
FIG. 19F shows the Arrhenius plot for copper oxide-titanium dioxide nanocatalysts with 50 wt % CuO.

FIGS. 19A-19C show the variation of the CO fractional conversion ($X_{CO}$)) with the W/F$_{CO}$ ratio for copper oxide-titanium dioxide nanocatalysts with 2 wt %, 20 wt % and 50 wt % CuO, respectively. FIGS. 19D-19F show the Arrhenius plots for copper oxide-titanium dioxide nanocatalysts with 2 wt %, 20 wt % and 50 wt % CuO, respectively. Kinetic studies were performed on three selected copper oxide-titanium dioxide nanocatalysts with different CuO weight ratio of 2 wt %, 20 wt % and 50 wt % to reveal the effect of CuO content on the catalytic behavior of the different catalysts. For each catalyst, the effect of varying the temperature and the catalysts loading at fixed molar gas flow rate was studied. In FIGS. 19A-19C, the plots of the CO fractional conversion are shown at different temperatures in the range of 60-125° C. For each selected catalyst at a fixed W/F$_{CO}$ ratio, a monotonic increase of CO conversion with increasing temperature can be seen, indicating that CO oxidation is enhanced at relatively higher temperatures. The increased CO oxidation can be attributed to the activation of the oxygen adsorbed on the catalyst surface, which results in formation of active oxygen species and vacancies leading to enhanced CO oxidation rates. This behavior is in agreement with the Raman and the XPS studies, which indicate the existence of vacancies and reducible oxygen species on these catalysts at the mid-temperature range.

The effect of the contact time in terms of W/F$_{CO}$ on the CO conversion is also presented in FIGS. 19A-19C. For each catalyst at a given temperature, the fractional CO conversion increases with increasing contact time from to 0.008 to 0.056 g µmol$^{-1}$ at fixed gas hourly space velocity (GHSV=3600/h). At the low contact time of 0.008 g s µmol$^{-1}$, a minimal CO conversion fraction is observed because of the high molar flow rate and the small catalyst weight. This may be due to the relatively lower number of active sites available for adsorption of reacting gaseous species, thus minimal CO oxidation is observed. When the contact time is increased to 0.016, 0.028, 0.042 and 0.056 g s µmol$^{-1}$ by increasing the catalyst loading mass, sufficient active sites can be realized, thus leading to increased CO conversion.

FIGS. 19D-19F show the Arrhenius plots for the selected catalysts of 2 wt %, 20 wt % and 50 wt % CuO, respectively, which were obtained under reaction conditions as described above. The apparent activation energies ($E_a$) determined from these Arrhenius plots are $E_a$ (apparent)=68.0±3.81 kJ mole$^{-1}$ ($R^2$=0.997), 79.88±2.48 kJ mole$^{-1}$ ($R^2$=0.995), 81.04±0.79 kJ mole$^{-1}$ ($R^2$=0.999) for the 2 wt %, 20 wt % and 50 wt % CO samples, respectively. The order of the apparent activation energy of the three catalysts is 50 wt %>20 wt %>2 wt % copper oxide-titanium dioxide nanocatalysts. The order of the calculated CO oxidation reaction rates at 155° C. is $r_{CO}$ (50 wt % Cu)>$r_{CO}$ (20 wt % Cu)>$r_{CO}$ (2 wt % Cu) with experimentally-determined values of 36 µmole s$^{-1}$ g$^{-1}$, 30 µmole s$^{-1}$ g$^{-1}$ and 4 µmole s$^{-1}$ g$^{-1}$, respectively.

The higher activation energy of the 50 wt % catalyst might suggest that its catalytic activity is lower than the other two catalysts, which contradicts the order of the CO oxidation reaction rates where the 50 wt % catalyst demonstrated the highest reaction rate of 36 µmole s$^{-1}$ g$^{-1}$ compared to 30 µmole s$^{-1}$ g$^{-1}$ and 4 µmole s$^{-1}$ g$^{-1}$ for the 20 wt % and 2 wt % catalysts, respectively. However, the experimentally-determined Arrhenius parameters and activation energies represent, at first, apparent values. The apparent activation energy for a bimolecular catalyzed reaction depends not only on the true surface activation energy and the heat of adsorption of reactants. Thus, the high values of the apparent activation energies may be due to the strong CO adsorption bond energy to the catalyst surface, which increases with increasing Cu loading and not actually due to a hindered surface reaction, as the order of the apparent activation energy may indicate.

It is to be understood that the present invention is not limited to the embodiments described above, but encompasses any and all embodiments within the scope of the following claims.

We claim:

1. A method of making a copper oxide-titanium dioxide nanocatalyst, comprising the steps of:
   sonicating a suspension of titanium dioxide ($TiO_2$) nanotubes in deionized water;
   adding an aqueous solution of $Cu(NO_3)_2 \cdot 3H_2O$ to form a mixture;
   stirring the mixture;
   adding an aqueous solution of $Na_2CO_3$ to the mixture dropwise until a pH of 9 is obtained;
   separating solid matter from the suspension by centrifuge;
   washing and drying the solid matter; and
   calcining the solid matter to obtain the copper oxide-titanium dioxide nanocatalyst.

2. The method of making a copper oxide-titanium dioxide nanocatalyst as recited in claim 1, wherein the step of sonicating the suspension of $TiO_2$ nanotubes in the deionized water comprises sonicating the suspension of $TiO_2$ nanotubes in the deionized water for a period of 10 minutes.

3. The method of making a copper oxide-titanium dioxide nanocatalyst as recited in claim 1, wherein the step of stirring the mixture comprises stirring the mixture at room temperature for two hours.

4. The method of making a copper oxide-titanium dioxide nanocatalyst as recited in claim 1, wherein the step of adding the aqueous solution of $Na_2CO_3$ to the mixture comprises adding a 0.2 mol/L aqueous solution of $Na_2CO_3$ to the mixture.

5. The method of making a copper oxide-titanium dioxide nanocatalyst as recited in claim 1, wherein the step of calcining the solid matter comprises calcining the solid matter at a temperature of 400° C. for two hours in air at a temperature ramp rate of 2° C./minute.

6. The method of making a copper oxide-titanium dioxide nanocatalyst as recited in claim 1, further comprising the steps of:
   adding $TiO_2$ anatase powder to an aqueous solution of NaOH to form an alkaline $TiO_2$ anatase mixture;
   stirring the alkaline $TiO_2$ anatase mixture;
   heating the alkaline $TiO_2$ anatase mixture;
   filtering to obtain a first filtrate from the heated alkaline $TiO_2$ anatase mixture;
   adding an aqueous solution of HCl to the first filtrate until a pH of 6 is obtained to yield a $TiO_2$-bearing product;
   filtering to obtain a second filtrate from the $TiO_2$-bearing product;
   heating the second filtrate at a temperature of 80° C.; and
   calcining the second filtrate at a temperature of 450° C. for two hours at a temperature ramp rate of 2° C./minute to yield the $TiO_2$ nanotubes.

7. The method of making a copper oxide-titanium dioxide nanocatalyst as recited in claim 6, wherein the aqueous solution of NaOH comprises an aqueous solution of 10 M NaOH.

8. The method of making a copper oxide-titanium dioxide nanocatalyst as recited in claim 6, wherein the step of stirring the alkaline $TiO_2$ anatase mixture comprises stirring the alkaline $TiO_2$ anatase mixture for 30 minutes.

9. The method of making a copper oxide-titanium dioxide nanocatalyst as recited in claim 8, wherein the step of heating the alkaline $TiO_2$ anatase mixture comprises heating the alkaline $TiO_2$ anatase mixture at a temperature of 140° C. for 48 hours.

* * * * *